United States Patent [19]

Ho et al.

[11] Patent Number: 6,091,953
[45] Date of Patent: *Jul. 18, 2000

[54] DISTRIBUTED SIGNALING MESSAGE ROUTING IN A SCALABLE WIRELESS COMMUNICATION SYSTEM

[75] Inventors: Joseph S. M. Ho, Dallas; Nhut Nguyen, Richardson; Hakan Ernam, Plano, all of Tex.

[73] Assignee: Nortel Networks Limited, Montreal, Canada

[*] Notice: This patent is subject to a terminal disclaimer.

[21] Appl. No.: 09/192,764

[22] Filed: Nov. 16, 1998

Related U.S. Application Data

[63] Continuation-in-part of application No. 09/127,104, Jul. 31, 1998
[60] Provisional application No. 60/055,109, Aug. 6, 1997.

[51] Int. Cl.[7] .................................................. H04Q 7/20
[52] U.S. Cl. ..................... 455/433; 455/560; 455/432; 455/445
[58] Field of Search ..................... 455/455, 446, 455/560, 433, 426, 432, 436, 439, 435, 422, 507, 508

[56] References Cited

U.S. PATENT DOCUMENTS

| | | | |
|---|---|---|---|
| 5,396,543 | 3/1995 | Beeson, Jr. et al. | 455/560 |
| 5,793,752 | 8/1998 | Clarke et al. | 370/252 |
| 5,854,982 | 12/1998 | Chambers et al. | 455/432 |
| 5,991,628 | 11/1999 | Pedziwiatr et al. | 455/443 |

*Primary Examiner*—Nguyen Vo
*Assistant Examiner*—Marsha D. Banks-Harold
*Attorney, Agent, or Firm*—Bruce Garlick; James A. Harrison

[57] ABSTRACT

A wireless communication system constructed according to the present invention assigns each serviced mobile unit to a serving mobile switching center to minimize mobility management overhead and to equalize loading among a plurality of mobile switching centers. The wireless communication system includes the plurality of mobile switching centers and a base station system which includes a plurality of base station controllers, each of which couples to a plurality of base stations. A plurality of mobile units served by the system are assigned to the mobile switching centers so that loading is equalized. In one particular construction of the wireless communication system, a dispatching switch couples the base station system to the plurality of mobile switching centers and performs the assignments of the mobile units. In an example of operation, upon attachment of a mobile unit, the dispatching switch determines loading of each of the mobile switching centers. Then, based upon the loading, the dispatching switch assigns the mobile unit to one of the mobile switching centers, the "serving" mobile switching center. During subsequent calls, the dispatching switch establishes a transparent path between a base station controller servicing the call and the serving mobile switching center. Thus, once the serving mobile switching center is determined, operation is transparent to the serving base station controller and the serving mobile switching center. In another particular construction, each of the base station controllers couple to each of the mobile switching centers via a network. In such case, each of the base station controllers and each of the mobile switching centers includes additional equipment which performs at least a portion of the operations of the dispatching switch. The network may be dissimilar to a conventional data structure supported by the wireless communication system. In still another implementation, a signaling message router function routes signaling messages to the serving mobile switching center by using the mobile unit's temporary identification number (as assigned by the serving mobile switching center). The signaling message router function may be implemented in the network coupling the base station subsystem with the mobile switching center (in a message router), in the base station controller or in the mobile switching center.

6 Claims, 23 Drawing Sheets

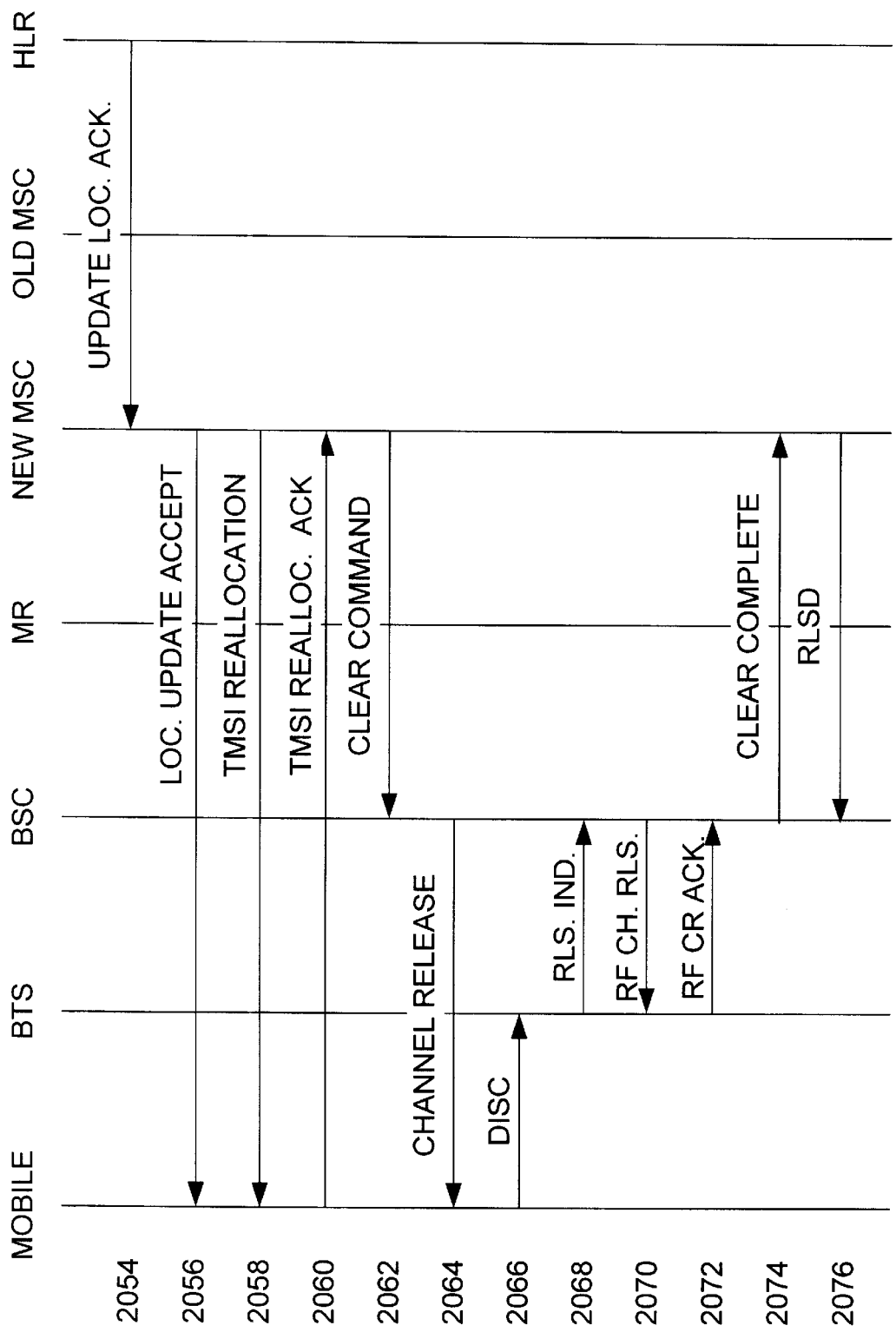

DISTRIBUTED SIGNALING MESSAGE ROUTING IN A SCALABLE WIRELESS COMMUNICATION SYSTEM

CROSS-REFERENCE TO RELATED APPLICATIONS

The present application is a continuation-in-part of U.S. Ser. No. 09/127,104, filed Jul. 31, 1998, which claimed priority pursuant to 35 U.S.C. Sec. 119(e) to U.S. Provisional application Ser. No. 60/055,109, filed Aug. 6, 1997, expired, both of which are hereby incorporated herein by reference in their entirety.

BACKGROUND

1. Technical Field

The present invention relates generally cellular wireless communication systems; and more particularly to a wireless communication system having an architecture that is scalable to compensate for loading levels, able to service any subscriber distribution and compliant with existing standards of operation and in which signaling messages specially routed to servicing system components based upon the content of the signaling messages.

2. Related Art

Wireless communication systems are generally known in the art to service wireless communications within a service area. The construction of a wireless communication system typically includes a plurality of base stations dispersed throughout the service area. The base stations couple to base station controllers (BSCs), with each BSC serving a plurality of base stations. Each BSC couples to a mobile switching center (MSC) that also couples to the public switched telephone network (PSTN) and to other MSCs. Mobile units operating within the wireless communication system establish communication with one or more of the base stations. The structure of the wireless communication system is hierarchical such that the load served by the base stations is routed via a predetermined path through a designated BSC to a designated MSC.

When the resources of the wireless communication system are insufficient to service load in a particular area, not all call requests will be serviced. Such insufficient capacity causes calls to be dropped, calls to be blocked and produces an overall degradation in system performance. Failing to service customers results in the loss of customers as well as a reduction in the revenue that would otherwise be generated by servicing the calls. Thus, it is extremely important to service as many calls as possible so that subscribers remain with the service provider and so that revenues are maximized.

System capacity may be limited by various components within the system. For example, base stations may become overloaded and fail to service subscribers requesting service. In such cases, as load grows within a particular portion of the system, additional base stations are deployed to handle the additional traffic. Likewise, when a number of base stations connected to any BSC provides overloads the BSC, additional BSCs are deployed to service the increased load.

MSCs also may become overloaded. The central processing unit and switching capacity of an MSC may only support a maximum level of traffic, messaging and overhead processing. As the capacity of existing MSCs is exhausted, additional MSCs must be introduced into the network. Of course, in the initial deployment of a system, an overall goal is to support the highest number of subscribers with the smallest infrastructure, typically including only a single MSC. This initial deployment not only minimizes the initial cost of deployment but reduces the networking overhead that results from subscriber mobility.

When an MSC (or multiple MSCs) serving a system become overloaded, additional MSCs must be deployed. In deploying additional MSCs within a system, the area served by the system is typically geographically partitioned to equalize loading among the MSCs. As the number of deployed MSCs increases, each served area becomes smaller and the number of boundaries between serving MSCs increases. The additional boundaries cause an increase in subscriber mobility between MSCs, the subscriber mobility consuming additional MSC CPU capacity. Resultantly, as additional MSCs are added within a system, the marginal benefit of each MSC deployment is reduced as the total number of deployed MSCs increases.

Further disadvantages of deploying MSCs relate to the partitioning of the service area. In determining where partitions between MSCs should be placed, an expensive and time consuming study is performed in an effort to equalize loading among MSCs in a manner which minimizes mobility overhead. Then, based upon the study, the system infrastructure must be physically altered and reprogrammed according to the partition. Such operations cause the system to be inoperable for periods of time during which subscribers are not served. Further, due to the difficulty in implementing the partition, system operators generally do not exactly implement the proposed partition which results in unbalanced load and reduced capacity.

Thus, there is a need in the art for a system and associated method of operation which allows additional MSCs to be deployed within a wireless communication system so that system capacity is increased accordingly and so that added overhead in system operation is minimized.

SUMMARY OF THE INVENTION

In order to overcome the described shortcomings of prior wireless communication systems, among other shortcomings, a wireless communication system constructed according to the present invention assigns each mobile unit to a serving mobile switching center among a plurality of mobile switching centers to equalize loading on the mobile switching centers. The wireless communication system includes the plurality of mobile switching centers and a base station system which includes a plurality of base station controllers, each of which couples to a plurality of base stations. To minimize mobility overhead, each mobile unit is served only by its serving mobile switching center. Signaling messages required to service a particular mobile unit are routed to its serving mobile switching center by utilizing the mobile unit's temporary identification number. Since no inter-mobile switching center hand-off and location updating are required, mobility overhead is significantly reduced. Also, assignment of mobile units to mobile switching centers can be performed in such a manner to equalize loading among the plurality of base stations.

In one particular construction of the wireless communication system, a message router couples the base station system to the plurality of mobile switching centers for purposes of signaling message routing and, in some cases, for the purpose of assigning mobile units to mobile switching centers. In an example of operation, upon attachment of a mobile unit to the system, the message router determines the loading on each of the mobile switching centers. Based upon the loading, the message router assigns the mobile unit to one of the mobile switching centers, the "serving" mobile switching center. The serving mobile switching center then assigns a temporary identification number (temporary ID) to the mobile unit that identifies itself as the serving mobile switching center. The temporary ID also uniquely identifies the mobile unit. The mobile unit stores the temporary ID in its local memory and uses the temporary ID to identify itself in future signaling connections.

During a subsequent operation, in which a signaling message is sent by a base station controller on behalf of the mobile unit (the signaling message containing the temporary ID), the message router intercepts the signaling message. The message router then extracts the temporary ID, determines the serving mobile switching center from the temporary ID, and routes the signaling message to the serving mobile switching center. The serving mobile switching center then may service the mobile unit, based upon the signaling message contents. Once the serving mobile switching center is determined, operation is transparent to the serving base station controller and the serving mobile switching center. Further, because of the nature of its operation, the loading on the message router is small.

In another particular construction, each of the base station controllers couple to each of the mobile switching centers via a network. In such case, each of the base station controllers and each of the mobile switching centers includes additional equipment which performs at least a portion of the operations of the message router. The network may be dissimilar to a conventional data structure supported by the wireless communication system. For example, the network may be packet switched network. In such case, data conversions must be performed for the base station controllers and mobile switching centers to operate in conjunction with the network. With such operations supported, a conventional data network may be employed to service the traffic between the base station controllers and the mobile switching centers.

In the operation of such a network-based construction, with the message router function incorporated into the base station controllers, the base station controllers initially assign mobile units to the mobile switching centers to balance load. In such assignment operations, the mobile switching centers assign temporary IDs from their own pool of such numbers. Each number in the pool identifies the mobile switching center. Alternatively, a message router may be connected to the network, with the message router performing the load balancing operations and assigning mobile units to their serving mobile switching centers. In either case, when traffic is serviced, the traffic passes across the network between a serving mobile switching center and a serving base station controller.

By equalizing load among the plurality of mobile switching centers, operation according to the present invention increases system capacity. With each of the mobile switching centers serving the whole service area, subscriber mobility overhead is substantially reduced. Thus, the deployment of an additional mobile switching center provides substantial benefit. Further, because the system need not be partitioned, substantial effort is eliminated.

Moreover, other aspects of the present invention will become apparent with further reference to the drawings and specification which follow.

BRIEF DESCRIPTION OF THE DRAWINGS

FIGS. 20A, 20B and 20C are message flow diagrams illustrating the flow of messages among the components of a wireless communication system constructed according to the present invention that includes a message router when a mobile station roams into the wireless communication system from a foreign wireless communication system.

DETAILED DESCRIPTION OF THE DRAWINGS

Figure 1:
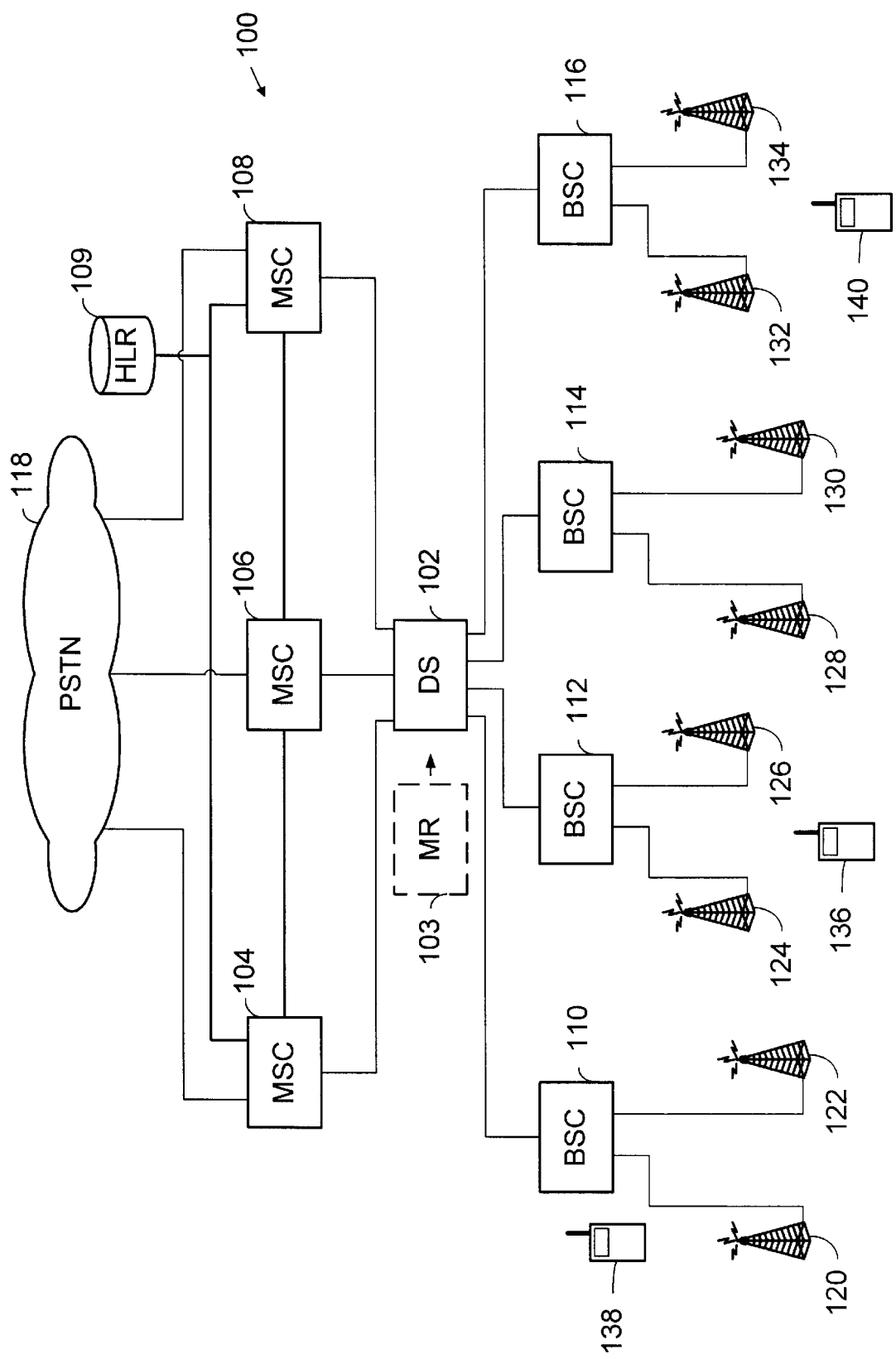
FIG. 1 is a system diagram illustrating a wireless communication system constructed according to the present invention.

FIG. 1 is a system diagram illustrating a wireless communication system 100 constructed according to the present invention. The system 100 includes a dispatching switch 102 that couples a plurality of mobile switching centers (MSCs) 104, 106 and 108 to a plurality of base station controllers (BSCs) 110, 112, 114 and 116. Each of the plurality of BSCs 110, 112, 114 and 116 couples to a respective plurality of base stations. As is shown, BSC 110 couples to base stations 120 and 122, BSC 112 couples to base stations 124 and 126, BSC 114 couples to base stations 128 and 130 and BSC 116 couples to base stations 132 and 134. Base stations 120–134 support wireless links between the system and a plurality of mobile units 136, 138 and 140 operating within a respective service area. The system 100 also includes a Home Location Register (HLR) 109 coupled to the MSCs 104, 106 and 108.

While the terms mobile switching center and base station controller are used extensively in this disclosure, this terminology is intended simply to label these components and not to limit their scope. While the terms mobile switching center and base station controller are typically used with reference to the GSM standard, similar components exist under other standards and could be interchanges with the mobile switching centers referred to herein. For example a Mobile Telephone Switching Office, a Mobile Telephone Exchange or another wireless system component that interfaces the wireless communication system 100 with other systems is interchangeable with the mobile switching centers described herein. Further, other wireless communication system components that interface with the base stations that serve same or similar functions as the base station controllers are interchangeable with the base station controllers described herein.

Construction and operation of the various components of the wireless communication system 100 are generally known. Thus, structures and operations described herein are provided only to explain the principles of the present invention and provide little reference to prior, known operations and constructions. In a particular implementation of the wireless communication system 100, the components operate in compliance with the Global system for Mobile communications (GSM). The various operations and constructions described herein compliment operation under GSM standards and provide backwards compatibility with GSM standards, sometimes with minor modifications. However, the description provided herein applies equally well to other standards as well, such standards including the IS-136 Time Division Multiple Access (TDMA) standard, the IS-95 Code Division Multiple Access (CDMA) standard and the ETSI GSM General Packet Radio Service (GPRS) standard, among others.

As illustrated, the wireless communication system 100 is constructed similarly to prior systems except for the insertion of the dispatching switch 102 between the MSCs 104, 106 and 108 and the BSCs 110–116 and base stations 120–134 (hereinafter, the combination of the BSCs 110–116 and base stations 120–134 will be referred to as the base station subsystem or "BSS"). The dispatching switch 102 routes communications between the BSS and the MSCs 104, 106 and 108. Each of the MSCs 104–108 couples to the Public Switched Telephone Network (PSTN) 118 to route calls between the PSTN 118 and the mobile units.

Each MSC is capable of servicing a maximum number of calls and a limited level of overhead operation. Thus, according to the present invention, the dispatching switch 102 assigns each mobile unit (e.g., 136, 138 and 140) to an MSC so as to equalize loading among the MSCs. The MSC selected to service the mobile unit is referred to as the serving MSC. Assignment to a particular MSC is typically performed when the mobile unit attaches to the system 100. Upon assignment, the Visitor Location Register (VLR) of the serving MSC is updated to reflect the assignment and an addressing table in the dispatching switch 102 is also updated to reflect the assignment. Further, the HLR 109 is updated to indicate the serving MSC so that calls directed to the mobile unit are correctly routed to the serving MSC.

In another embodiment, the dispatching switch 102 is replaced by a message router 103 in which no addressing table is required. In such case, a Temporary Mobile Subscriber Identity (TMSI), or another temporary identification number is assigned to the mobile unit by a serving MSC that was selected by the message router 103. The TMSI also uniquely identifies the mobile unit. Such assignment is made in the initial signaling with the mobile unit when the mobile unit first registers with the system 100. Upon subsequent operations, the TMSI is included in messages sent from the mobile unit to its serving MSC. The message router 103, reading the identity of the serving MSC from the TMSI assigned to the mobile unit therefore routes messages and traffic to the serving MSC. Thus, no addressing table is necessary in the message router 103. The message router 103 forwards signaling messages to the serving MSC based on the temporary ID (TMSI) of the mobile unit. The message routing function may be implemented as a centralized entity that replaces the dispatching switch 102. The messaging routing function may also be implemented in a distributed fashion, as part of the mobile switching center. In such case, no modification is required for the interface between the mobile switching center and the base station subsystem. The message routing function can also be implemented in a distributed fashion as part of the base station sub-system.

For example, when mobile unit 136 first powers up in the service area of the system 100, it listens for the beacon signal of a base station and, in response, transmits an attach request to the base station. Alternately, if the mobile unit 136 is already operational when it enters the service area of the system 100, it listens for the beacon signal and, in response, transmits a location update request. The attach request (or location update request) flows through the BSS to the dispatching switch 102 which, upon receipt of the request, determines whether the mobile unit 136 has been assigned to one of the MSCs 104, 106 or 108. If the mobile unit 136 has not been assigned to an MSC, the dispatching switch 102 assigns the mobile unit 136 to one of the MSCs 104, 106 or 108. Further, in the message router 103 embodiment, the message router assigns the mobile unit 136 to one of the MSCs 104, 106 and 108.

In determining the MSC assignment, the dispatching switch 102 (or message router 103) considers loading of each of the MSCs 104, 106 and 108 and other system considerations that would make assignment to one of the MSCs over other of the MSCs preferable. In making this determination, the dispatching switch 102 determines that MSC 106 will be assigned to the mobile unit 136 and updates the VLR of MSC 106 and its own addressing table. The MSC 106 or the dispatching switch, depending upon the implementation, then updates the HLR 109 to indicate that MSC 106 is the serving MSC for the mobile unit 136. Subsequently, MSC 106 services all calls from and to the mobile unit 136 via the dispatching switch 102. Calls directed to the mobile unit 136 and serviced by the MSC 106 are either routed to the serving MSC 106 via the PSTN 118 or via a gateway MSC, depending upon the particular implementation.

Unlike the dispatcher switch 102, the message router 103 is relatively simple. Its only function is to extract the temporary ID of the mobile unit from the message header and to forward the message to the serving MSC. As a result, the message router 103 does not require intelligence to interpret and generate signaling messages. All mobility and call related functions, such as updating the HLR, will be performed by the MSC rather than the message router 103. In this fashion, little additional overhead is required to implement the teachings of the present invention. Further, the message router 103 routes no user traffic. Thus, the message router 103 is not required to switch user traffic and such user traffic passes through a separate connection between the MSCs 104, 106 and 108 and the BSCs 110–116.

Figure 2:
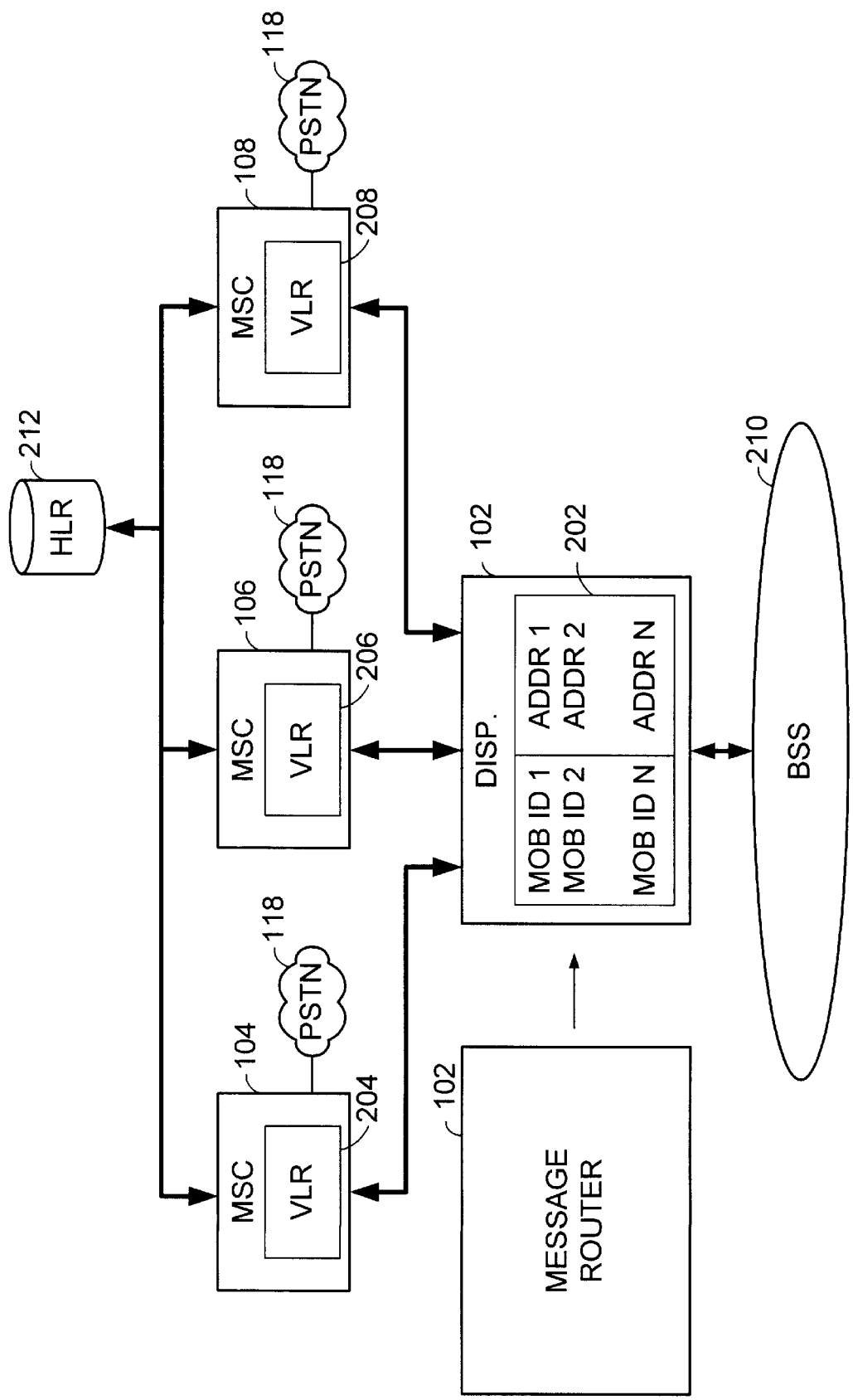
FIG. 2 is a system diagram illustrating in more detail the wireless communication system of FIG. 1.

FIG. 2 is a system diagram illustrating in more detail the wireless communication system 100 of FIG. 1. As shown, the BSS 210 couples to the dispatching switch 102 which also couples to MSCs 104, 106 and 108. Further, each MSC 104–108 couples to the PSTN 118 and also couples to a Home Location Register (HLR) 212 serving the system 100. As shown, the dispatching switch 102 includes an addressing table 202 and each MSC includes a VLR. As shown, MSCs 104, 106 and 108 include VLRs 204, 206 and 208, respectively.

The connections illustrated between the system components are for illustrative purposes only. Actual connections between components may be implemented using various techniques. For example, the connections between MSCs 104, 106 and 108 and the HLR 212 may be implemented using a network that provides signaling and control functions. The connections between the dispatching switch 102 and the MSCs 104–108 may be implemented using a multi-function network that performs both traffic and signaling functions. Alternatively, a first network coupled between the dispatching switch 102 and the MSCs 104–108 provides signaling functions while a second network carries the traffic between the dispatching switch 102 and the MSCs 104–108. The connections between the BSS 210 and the dispatching switch 102 include both signaling and traffic components as well and could also be implemented in a signal network or could be implemented in separate traffic and signaling networks.

In an alternate embodiment, the dispatching switch 102 is replaced by a message router 103 and each mobile unit serviced by the system is assigned a TMSI that identifies its serving MSC. In such embodiment, user traffic is not routed through the message router 103 but instead bypasses the message router 103. The message router only forwards signaling messages. Thus, user traffic is carried by a separate connection from the BSS 210 to the serving MSC 104, 106 or 108.

The functions performed by the dispatching switch 102 are altered depending upon the construction of the system within which the dispatching switch 102 is implemented. When separate traffic and signaling networks are employed, the dispatching switch 102 may perform only signaling and control functions and simply direct the routing of traffic within the traffic network. Such a construction will be discussed with reference to FIG. 15. In a system wherein traffic and signaling are supported by a single network, the dispatching switch 102 may be required to perform both traffic routing and signaling functions. Such a dispatching switch will be discussed with reference to FIG. 4.

Considering now the embodiment in which the message router 103 is employed, if the same network carries both signaling and user traffic, only the signaling messages will be routed through the message router 103. User traffic will by-pass the message router 103 and be sent directly to a serving MSC via an appropriate routing path.

The addressing table 202 contained in the dispatching switch 102 cross-references each mobile unit that has attached to the system to one of the MSCs 104, 106 and 108 of the system. When a mobile unit first attaches to the system, the dispatching switch 102 assigns the mobile unit to one of the MSCs 104, 106 and 108. An entry in the VLR of the serving MSC is made upon such an attachment as well as an entry in the HLR 212 indicating that the serving MSC. Further, upon the assignment of a mobile unit to the serving MSC, an entry is made in the addressing table 202 which cross-references the mobile unit to the serving MSC. When a call from or to the mobile unit is serviced, the traffic is routed between the serving MSC and the BSS 210 by the dispatching switch 102.

There is no addressing table in the message router 103 since routing information is contained in the TMSI of the mobile unit. However, the message router 103 still has to store a small table which maps the MSC ID to a network address (such as the SS7 point code) that can be used to direct the signaling message to the serving MSC.

In an example of operation of the system, a mobile unit first attaches to one of the base stations of the BSS 210 or, alternatively, sends a location update request to the BSS 210. The dispatching switch 102 receives the attach request (or location update request) from the mobile unit and, based upon information regarding the MSCs 104–108, assigns the mobile unit to MSC 108, the serving MSC. MSC 108 then accesses the HLR 212 which causes the HLR 212 to be updated and subsequently updates its VLR 208 with the accessed information. When the dispatching switch 102 makes the assignment, the dispatching switch 102 updates the addressing table 202 with the identity of the mobile unit and the identity of the serving MSC 108 to which the mobile unit was assigned.

With the message router 103, there is no addressing table. Instead, the serving MSC assigns a temporary ID (TMSI) to the mobile unit. The temporary ID contains the ID of the serving MSC, which will later be used by the message router 103 to forward messages originated by the mobile unit to the serving MSC.

During subsequent operations, when a call is initiated from or to the mobile unit, the dispatching switch 102 routes the call between the serving MSC 108 and the BSS 210. By assigning mobile units based upon loading levels of the MSCs, the dispatching switch 102 may equalize loading among the MSCs. Further, because the dispatching switch 102 routes all calls within the system, all, or substantially all handover between MSCs is eliminated. The loading on MSCs due to subscriber mobility is substantially reduced, thus allowing each MSC to service a greater level of traffic.

Figure 3:
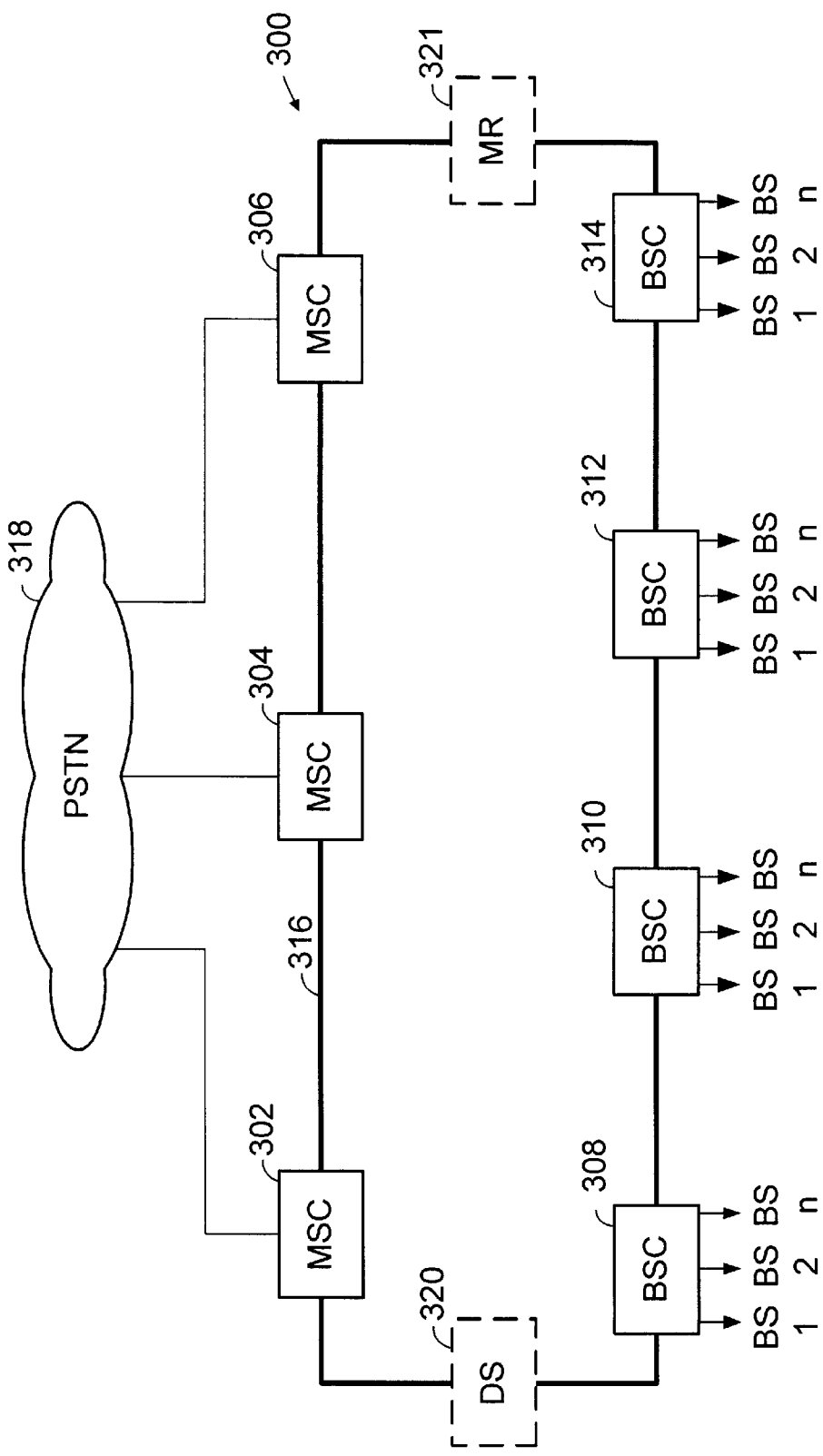
FIG. 3 is a system diagram illustrating an alternate structure of a wireless communication system constructed according to the present invention.

FIG. 3 is a system diagram illustrating an alternate structure of a wireless communication system 300 constructed according to the present invention. As compared to the structure of the system of FIGS. 1 and 2, the system 300 may not include a dispatching switch as a separate component, but incorporates such functionality into other system components, such as the BSCs and MSCs. In such a construction, MSCs 302, 304 and 306 and BSCs 308, 310, 312 and 314, together, provide functions similar to those provided by the dispatching switch 102 of FIGS. 1 and 2.

In another construction, a message router takes the place of the dispatching switch. In such construction, the message router is incorporated into the BSCs/MSCs so that no externally visible box is required. Since there is no addressing table required in the message router embodiment, the synchronization of addressing tables in different message routers is not necessary. As a result, multiple message routers can be installed in the network. In such case, message routing functionality may be included in BSCs 308, 310, 312 and 314 or MSCs 302, 304 or 306. Such multiple message router implementation will distribute the overhead in assigning TMSIs and in routing messages and traffic within the system.

As shown, BSCs 308, 310, 312 and 314 and MSCs 302, 304 and 308 are coupled via a network 316. In FIG. 3, the network 316 is shown to have a ring structure that may operate according to Asynchronous Transfer Mode (ATM) standards. However, the network 316 could operate according to different standards and/or could have a different physical structure. The function of the network 316 is to route traffic/messages between the BSCs 308, 310, 312 and 314 and the MSCs 302, 304 and 308. In one particular construction, the network 316 carries only traffic with messages and other control functions carried by a separate network. However, in another particular construction, the network 316 carries traffic as well as supports messaging/control functions. In either case, the connections between the MSCs 302, 304 and 308 and the BSCs 308, 310, 312 and 314 are not hierarchical.

Each of the BSCs 308–314 couples to and services a plurality of base stations. Further, each of the MSCs 302, 304 and 306 couples to the PSTN 318. In the operation of the system 300, each mobile unit that is serviced by the system 300 is assigned to one of the MSCs 302, 304 or 306. After such assignment, the serving MSC services all calls originated from or terminated to the mobile unit. In setting up and servicing the call, all required communications and control messages are routed between the serving BSC and the serving MSC via the network 316. As will be described with reference to FIGS. 5A and 5B, the BSCs 308–314 and MSCs 302–306 include components employed to properly route the traffic and messages. These components of the BSCs 308–314 and the MSCs 302–306 operate to assign each mobile unit that is serviced by the system 300 to one of the MSCs 302–306 in a manner that equalizes loading on the MSCs 302–306.

The system 300 may also include a dispatching switch 320 that performs the overhead required to setup and route traffic/messages between the BSCs 308–314 and the MSCs 302–306. When provided, the dispatching switch 320 includes an addressing table which assigns and maintains routing information used in setting up and routing the traffic/messages. In a fashion similar to that described with reference to the dispatching switch 102 of FIG. 1, when a mobile unit requests service within the system 300, the dispatching switch 320 assigns the mobile unit to one of the MSCs 302–306 based upon loading of the MSCs 302–306.

A VLR of the assigned MSC and the HLR are then updated to indicate that the mobile unit is served by the MSC. Subsequently, the MSC services all traffic/messages for the mobile unit.

When a message router implementation is employed, user traffic will not be routed through the message router 321. Thus, overhead will be reduced due to such reduction in routing operations.

Figure 4:
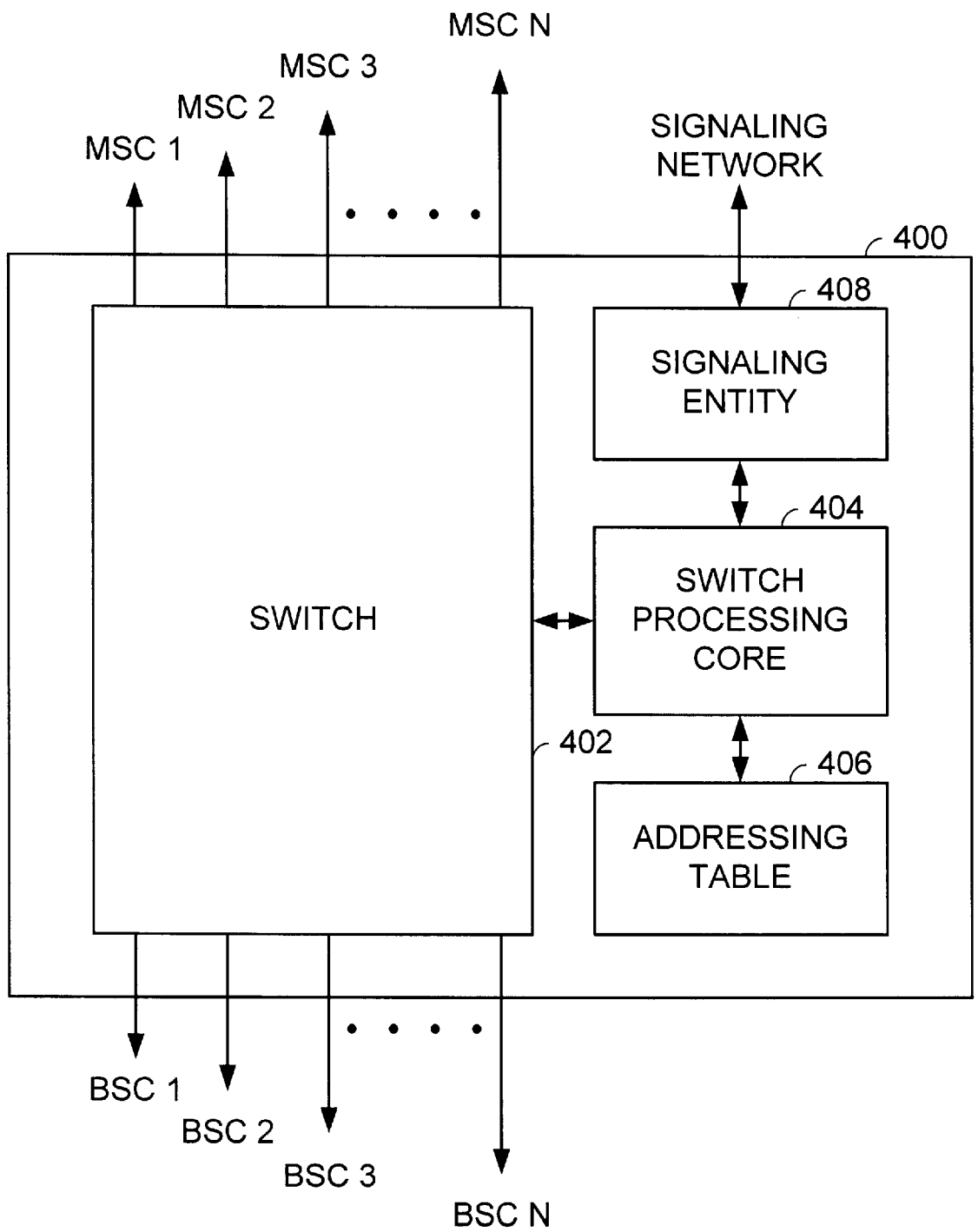
FIG. 4 is a block diagram illustrating a dispatching switch (and a message router) constructed according to the present invention and consistent with the system of FIG. 1.

FIG. 4 is a block diagram illustrating a dispatching switch 400 (or message router) constructed according to the present invention consistent with a system having the structure illustrated in FIGS. 1 and 2. The dispatching switch 400 includes a switch fabric 402, a switch processing core 404, an addressing table 406 and a signaling entity. The switch fabric 402 provides physical traffic connections between the BSCs and the MSCs. Each of these traffic connections is represented by a single path. However, in practice, a plurality of calls will be received from and routed to each of the BSCs and each of the MSCs. The switch fabric 402, in some implementations, will service time based switching deconstruction and construction to properly route calls between the BSCs and MSCs. However, in other implementations, the switch fabric 402 performs more complicated switching operations as are required by the system. In contrast to the dispatching switch 400, a message router requires no switching fabric because it does not route user traffic.

The switch processing core 404 performs the overhead operations necessary in assigning mobile units to MSCs and in routing calls and messages between the mobile units and the assigned MSCs. The addressing table 406 is used by the dispatching switch 400 to establish and maintain the assignments. After initial assignment, the dispatching switch 400 accesses the addressing table 406 to determine how to properly route communications and messages between the BSCs and the MSCs. Based upon the access, the switch processing core 404 operates the switch fabric 402 to route traffic.

The construction of a message router is similar to that of the dispatching switch 400. However, in a message router, there is no switch processing core or addressing table. But, a simple processing unit is required in the message router to inspect each signaling message from the BSS, extract the temporary ID of the mobile unit from the message header, and forward the message to the serving MSC. This processing unit also selects the serving MSC for mobile units that enter the network from a foreign network or mobile units that do not use the temporary ID to identify themselves in signaling messages and other communications.

The signaling entity 408 couples to a signaling network and the switch processing core 404 and performs signaling functions for the dispatching switch 400. During normal operation, the signaling entity 408 interfaces with BSCs and MSCs that are also coupled to the dispatching switch 400 to direct the flow of traffic within the system. Thus, the signaling entity 400 coordinates operation of the dispatching switch 400 with the switch processing core 404 as well as with the coupled components.

In a message router, the signaling entity of the message router is responsible for interfacing with the BSCs and MSCs through the signaling network and for directing the flow of signaling traffic within the system. In the described embodiment, the message router performs no additional functions. However, in other embodiments, the message router may be constructed to perform other additional functions. As compared to the dispatching switch, the message router functions only to route signaling messages and does not service user communications.

Figure 5A:
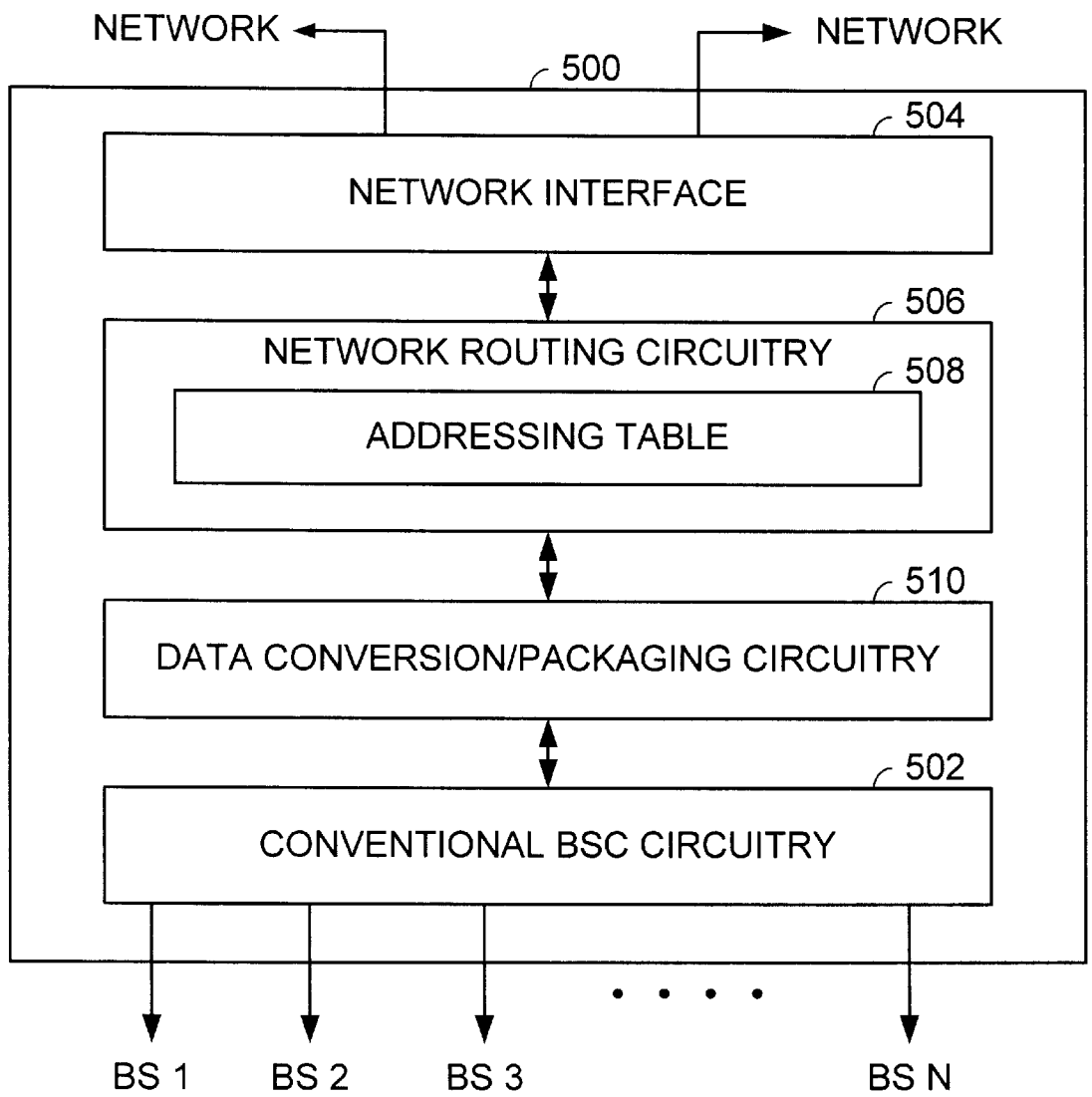
FIG. 5A is a block diagram illustrating a base station controller (BSC) constructed according to the present invention and consistent with the system of FIG. 3.

FIG. 5A is a block diagram illustrating a BSC 500 constructed according to the present invention that may operate in a system 300 such as that illustrated in FIG. 3. The BSC 500 includes conventional BSC circuitry 502 that interfaces to a plurality of base stations. The conventional BSC circuitry 502 may be substantially similar to that contained within a prior BSC. The BSC 500 also includes data conversion/packaging circuitry 510 that converts traffic and messages between a format supported by the conventional BSC circuitry 502 and a digital packetized format supported by the network 316.

Network routing circuitry 506 couples to the data conversion/packaging circuitry 510 and performs network routing functions. The network routing circuitry 506 includes an addressing table 508 which stores information identifying the serving MSC (as well as the network address) for each mobile unit serviced by the BSC 500. The information stored may include both the identity of the serving MSC and the network address of the serving MSC. The network routing circuitry 506 couples to a network interface 504 which couples the BSC 500 to the network 318.

When a message router implementation is employed instead of that of the dispatching switch, circuitry of the BSC 500 is similar. However, in the message router implementation, no addressing table 508 is needed. The network routing circuitry 506 simply routes signaling messages to the MSCs based on the temporary ID (TMSI) obtained from the message header. Therefore, no addressing table 508 is required.

When the BSC 500 receives traffic/messages from a coupled base station, the conventional BSC circuitry 502 receives the traffic/messages, performs conventional processing operations and passes the traffic/messages to the data conversion/packaging circuitry. The conventional BSC circuitry supports traffic/message data formats that may be inconsistent with the network 318. Thus, the data conversion/packaging circuitry 510 converts the traffic/messages to a digital packet data format when required and passes the traffic/messages to the network routing circuitry.

The network routing circuitry 506 determines the intended destination of the traffic/message based upon its content or based upon instruction received from the conventional BSC circuitry 502. When the intended destination is based upon traffic/message content, the network routing circuitry may access the addressing table 508 to determine the serving MSC of the mobile unit. The network routing circuitry 506 then sets the network address of the traffic/message accordingly and passes the traffic/message to the network interface 504 which passes the traffic/message to the network 318. Based upon the network address appended to the traffic/message, the network 318 routes the traffic/message to the serving MSC.

The network interface 504 receives traffic/messages intended for the BSC 500 from serving MSCs over the network 318. Upon receipt, the network interface 504 passes the traffic/messages to the network routing circuitry 506. If required, the network routing circuitry 506 determines the serving MSC based upon the source network address. The network routing circuitry 506 may also determine the intended BSC based upon content of the traffic/message. In one embodiment, each BSC is assigned a particular network address, with the network routing circuitry having knowledge of its network addresses. After receipt, the network routing circuitry 506 passes the traffic/message to the data conversion/packaging circuitry 510 which converts the traffic/message to a format consistent with the conventional BSC circuitry 502. The data conversion/packaging circuitry 510 then passes the traffic/message to the conventional BSC circuitry 502. The conventional BSC circuitry 502 then passes the traffic/message to the intended mobile unit.

Figure 5B:
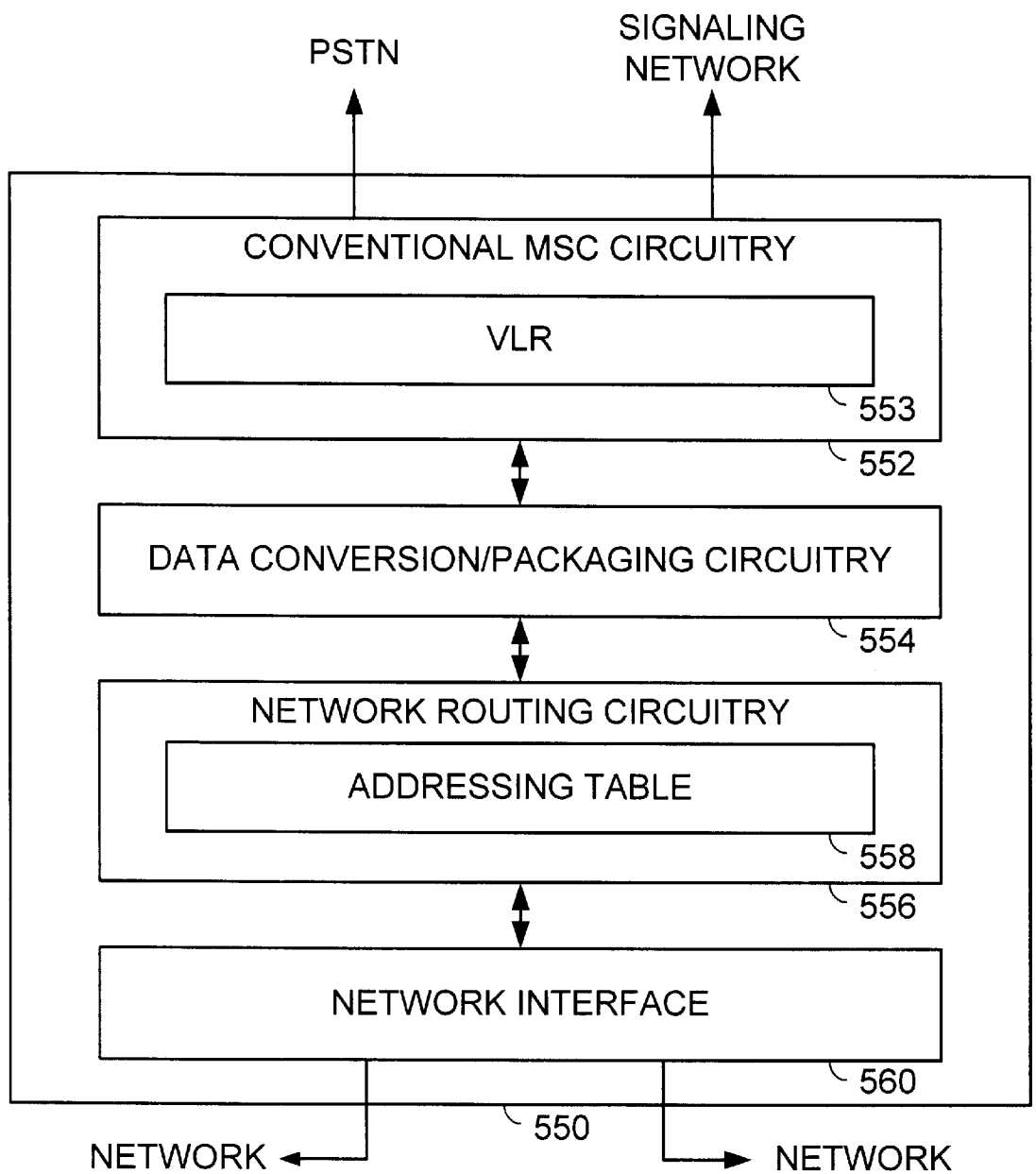
FIG. 5B is a block diagram illustrating a mobile switching center (MSC) constructed according to the present invention and consistent with the system of FIG. 3.

FIG. 5B is a block diagram illustrating an MSC 550 constructed according to the present invention consistent with the system of FIG. 3. The MSC 550 includes conventional MSC circuitry 552 that couples the MSC to the PSTN and to a signaling and control network such as a private network. The conventional MSC circuitry 552 includes a VLR 553. The MSC 550 further includes data conversion/packaging circuitry 554 which interfaces with the conventional MSC circuitry 552. Network routing circuitry 556 couples to the data conversion/packaging circuitry 554 and includes a BSC addressing table which, for each mobile unit served by the MSC 550, stores the network location/identity of the BSC that currently serves the mobile unit. Finally, the MSC 550 includes a network interface 560 which interfaces the MSC 550 to the network 316 of FIG. 3.

In the operation of the MSC 550, the MSC 550 receives traffic/messages from coupled BSCs over the network 316 via the network interface 560. The network interface 560 passes the traffic/message to the network routing circuitry 556. Based upon information contained in the traffic/messages, the network routing circuitry 556 determines the source of the traffic/message. When BSC identities are not appended to the traffic/message, the network routing circuitry 556 cross references the source network address appended to the traffic/messages to information contained in the BSC addressing table 558 to determine the identity of the BSC that sent the traffic/message to the MSC 550. The traffic/message is then sent to the data conversion/packaging circuitry 554 that converts the traffic/message from their digital packetized format to a format compatible with the conventional MSC circuitry 552.

In transmitting the traffic/message from the MSC 550 to a BSC via the network 316, the data conversion/packaging circuitry 554 receives the traffic/message from the conventional MSC circuitry 552. The data conversion/packaging circuitry 554 then converts the traffic/message to a digital packetized format and passes the converted traffic/message to the network routing circuitry 556. Based upon the identity of the mobile unit for which the traffic/message is intended, the network routing circuitry 556 accesses the BSC addressing table to the network address of the serving BSC. The network routing circuitry 556 then passes the traffic/message to the network interface 560 which transmits the traffic/message on the network 316. Based upon the appended network address, the traffic/message will be received by the serving BSC.

Figure 6:
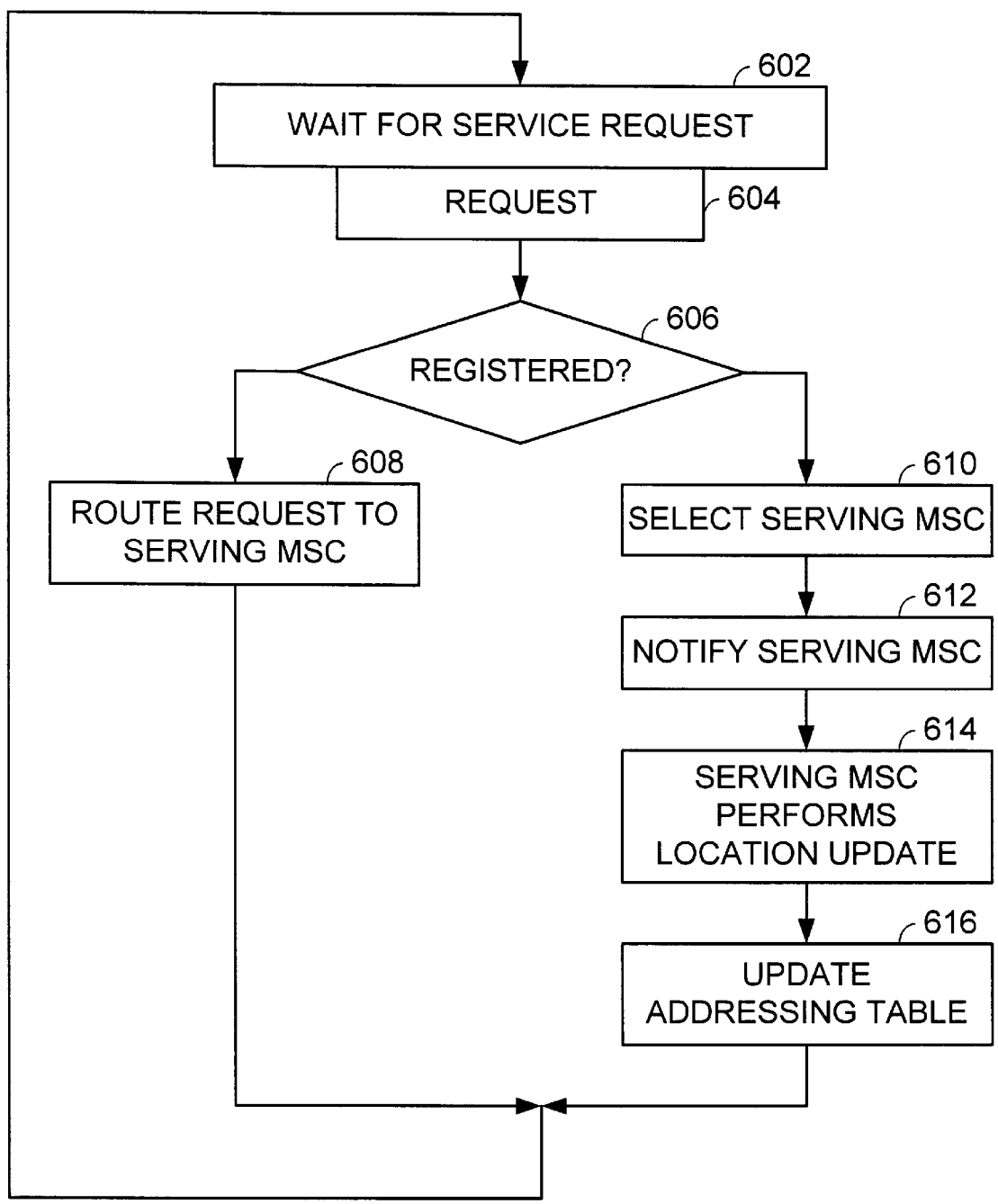
FIG. 6 is a logic diagram illustrating operation of a dispatching switch (and a message router) in assigning a mobile unit to one of a plurality of MSCs.

FIG. 6 is a logic diagram illustrating operation of a dispatching switch (or a message router) in assigning a mobile unit to one of a plurality of MSCs. Operation commences at step 602 wherein the dispatching switch waits for a service request from a mobile unit. The service request may be an attach request when the mobile unit powers-up within the system or a location update request when the mobile unit enters the system. When a service request is received at step 604, operation proceeds to step 606 where the dispatching switch determines whether the mobile unit has been previously assigned to one of the MSCs of the system. This operation could be performed by performing a lookup in the addressing table, searching for a record indexed by the identification of the mobile unit.

If it is determined that the mobile unit has been previously registered with an MSC of the system, the service request is routed to the previously assigned serving MSC at step 608. The MSC may then send a confirmation message to the mobile unit. Then, from step 608, operation proceeds to step 602. Alternately, the dispatching switch could send a confirmation message to the mobile unit based upon the contents of the addressing table.

If at step 606, it is determined that the mobile unit has not been previously assigned to one of the MSCs, operation proceeds to step 610 wherein a serving MSC is selected from the MSCs of the system. As was previously discussed, mobile units are assigned to MSCs to equalize loading among the serving MSCs. Such a determination may be made based upon periodically querying MSCs and determining their loading levels (e.g., every 15 minutes), immediate reference to the addressing table or via an immediate query of the coupled MSCs. A particular operation employed in determining loading based upon query of the MSCs will be described with reference to FIG. 11. Next, at step 612, the selected serving MSC is notified at step 612 of the identity of the mobile unit. In response, the serving MSC performs a location update at step 614, such location update including updating its VLR and the HLR to indicate the serving MSCs identity. Then, at step 616, the dispatching switch updates the addressing table. From step 616, operation returns to step 602.

The operation described with reference to FIG. 6 coincides with the structure of the system of FIGS. 1 and 2 or with the structure of FIG. 3 when a dispatching switch is included in the system 300. However, when the system of FIG. 3 does not include a dispatching switch, each of the BSCs would, upon receipt of an attach request from a mobile, select a serving MSC according to the technique described. Operations related to assignment to accomplish equalized loading could therefore be employed by each of the BSCs illustrated in FIG. 3 to equalize loading among the MSCs.

When a message router (the message router function can be stand alone or included in the network between the BSCs and the MSCs, or in either the BSC and/or the MSC) is employed instead of a dispatching switch, the message router, at step 606 determines whether the mobile unit has previously been registered by checking if the received signaling message contains a valid temporary ID. If the temporary ID is valid, the message is routed to the serving MSC as indicated by the temporary ID at step 608. Otherwise, the message router selects a MSC for the mobile unit at step 610 and forwards the signaling message to the selected serving MSC. The serving MSC will then perform a location update for the mobile unit. Because the message router includes no addressing table, no update to the addressing table is required at step 616.

Figure 7:
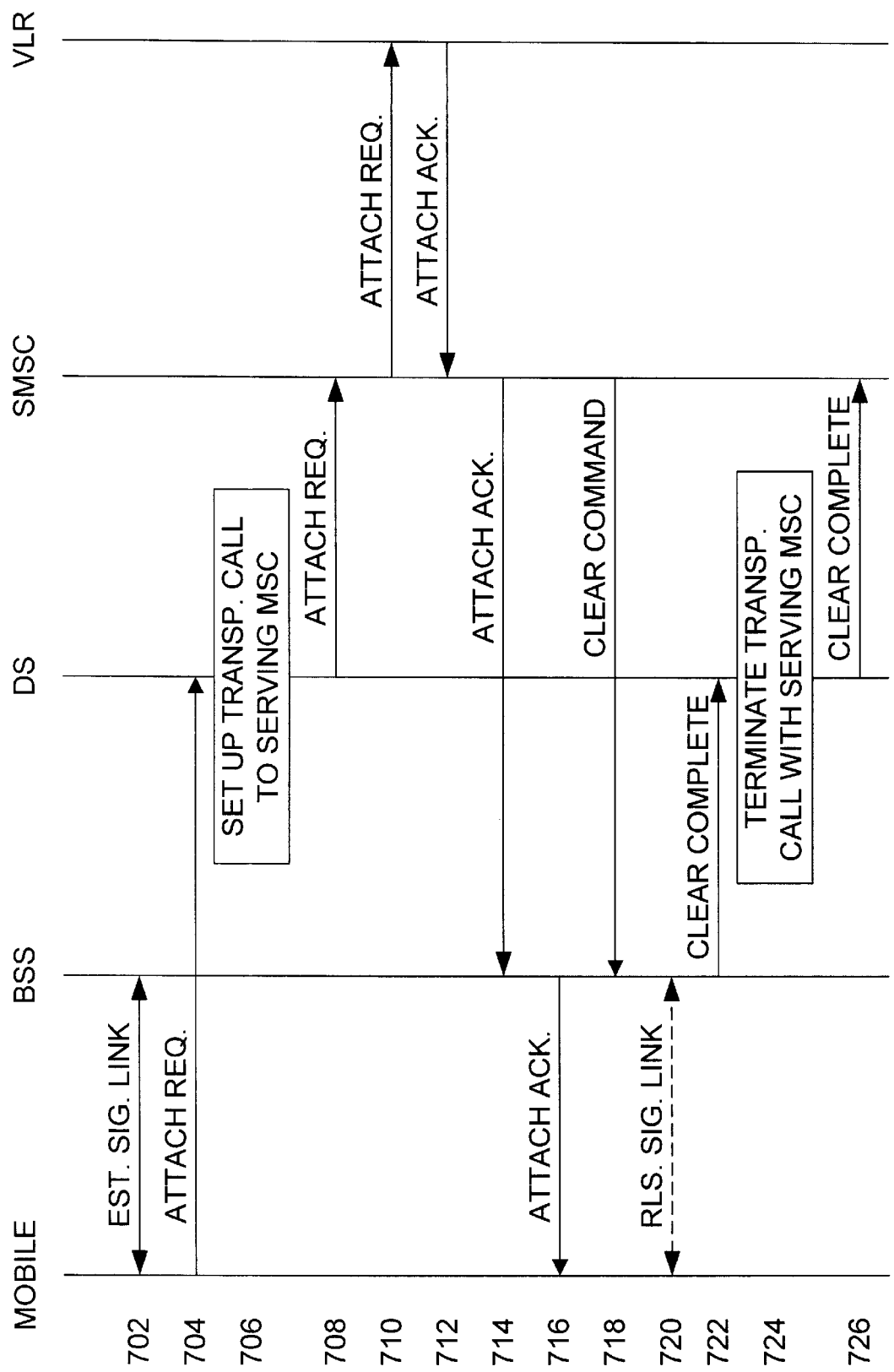
FIG. 7 is a message flow diagram illustrating the flow of messages among the components of a wireless communication system constructed according to the present invention in assigning a mobile unit to one of a plurality of MSCs.

FIG. 7 is a message flow diagram illustrating the flow of messages among the components of a wireless communication system constructed according to the present invention in assigning a mobile unit to one of a plurality of MSCs. The described operation applies to both the dispatching switch and message router implementations previously described. At 702 the mobile unit and the BSS establish a signaling link. Once the signaling link is established, the mobile unit sends an attach request to the dispatching switch (or message router) via the BSS at 704. The attach request could be a RIL-3 MM IMSI Attach <TMSI> message compliant with GSM standards. Upon receipt of the attach request, the dispatching switch (or message router) selects a serving MSC for the mobile unit and sets up a transparent call to the serving MSC at 706. Then at 708, the dispatching switch (or message router) passes the attach request to the serving MSC. The serving MSC then sends an attach request to the corresponding VLR of the serving MSC at 710. In sending the attach request to the corresponding VLR, the serving MSC may convert the attach request to another message type, such as a MAP/B Attach IMSI <TMSI> format.

Upon receipt of the attach request, the VLR creates/updates an entry for the mobile unit, updates the HLR and sends an attach acknowledge to the serving MSC at 712. The attach acknowledge may take the form of an IMAP/B IMSI Attach Acknowledge message. The serving MSC receives the attach acknowledge message and, in response, transmits an attach acknowledge message to the BSS at 714. The attach acknowledge message may take the form of an IMSI Attach acknowledge message. In response, the BSS sends an attach acknowledge message to the mobile unit at 716. Such attach acknowledge message may take the form of an MM IMSI Attach acknowledge message.

In addition to the above, if an attach request or location update request has been performed, the MSC/VLR also assigns a new temporary ID (such as the TMSI under the GSM standard) to the mobile unit. The mobile unit receives this temporary ID from the MSC/VLR and stores this ID at a register inside the mobile unit. The mobile unit will use this temporary ID as an identity in future requests sent to the MSC/VLR.

After the attachment has been acknowledged, the serving MSC sends a clear message to the BSS at step 718. The clear message may take the form of a BSSMAP Clear Command. The BSS releases the signaling link at 720 and the BSS sends a clear complete message to the dispatching switch at 722. The clear complete message may take the form of a BSSMAP Clear Complete. Upon receipt of the clear complete message, the dispatching switch terminates the transparent call with the serving MSC at 724 and sends a clear complete message to the serving MSC at 726. The clear complete message may take the form of a BSSMAP Clear Complete message.

Figure 8:
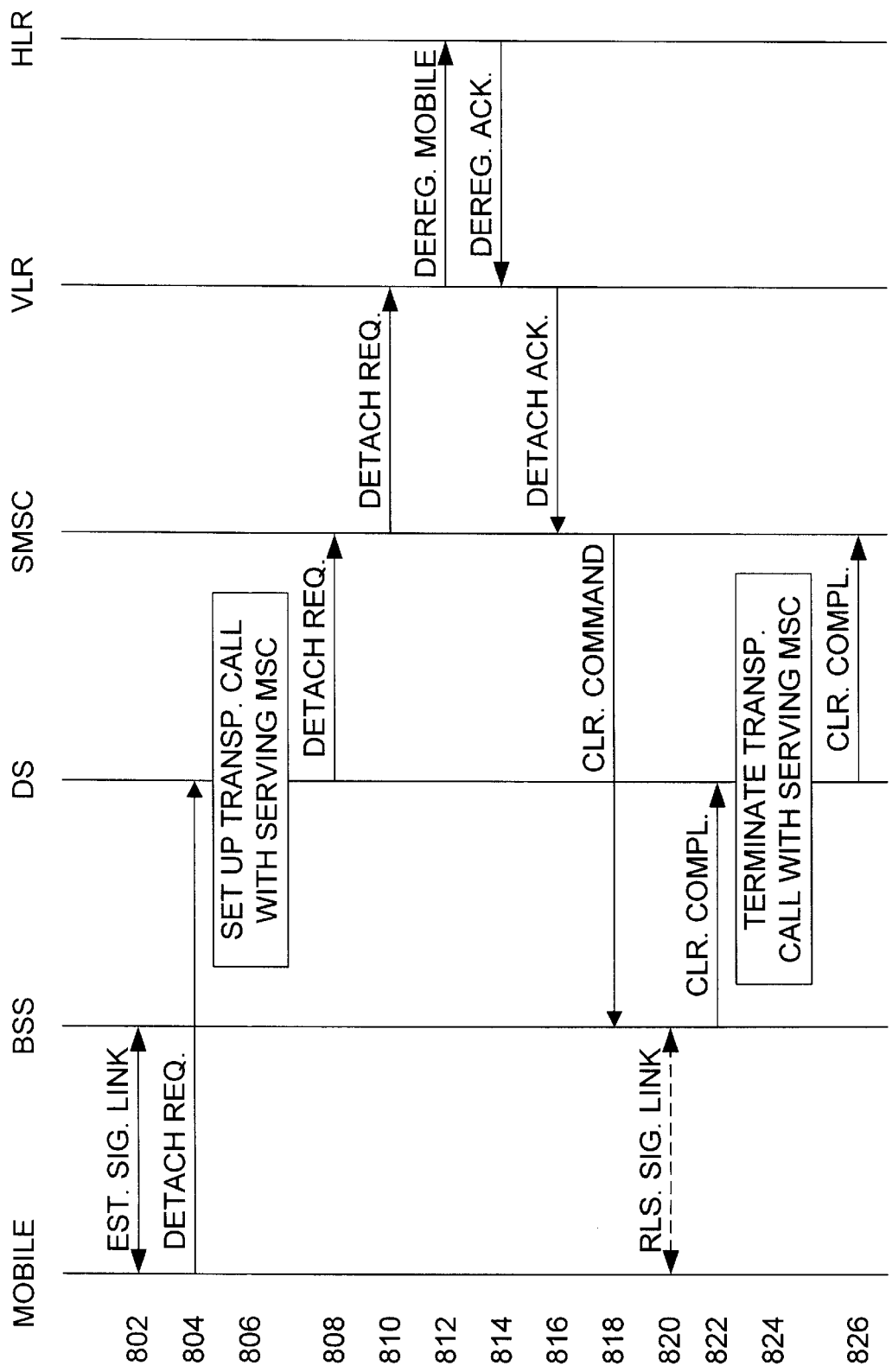
FIG. 8 is a message flow diagram illustrating the flow of messages among the components of a wireless communication system constructed according to the present invention in detaching a mobile unit from a serving MSC.

FIG. 8 is a message flow diagram illustrating the flow of messages among the components of a wireless communication system constructed according to the present invention in detaching a mobile unit from a serving MSC. At 802 the mobile unit and the BSS establish a signaling link. Once the signaling link is established, the mobile unit sends a detach request to the dispatching switch (or message router) via the BSS at 804. The detach request could be a RIL-3 MM IMSI Detach <TMSI> message compliant with GSM standards. Upon receipt of the detach request, the dispatching switch (or message router) looks up the serving MSC for the mobile unit in the addressing table and sets up a transparent call to the serving MSC at 806. Then, at 808, the dispatching switch (or message router) passes the detach request to the serving MSC. The serving MSC then sends a detach request to the corresponding VLR of the serving MSC at 810. In sending the detach request to the corresponding VLR, the serving MSC may convert the detach request to another message type, such as a MAP/B Detach IMSI <TMSI> format.

In a message router implementation, the message router determines the serving MSC of the mobile unit based on the temporary ID in the message header. There is no addressing table lookup.

Upon receipt of the detach request, the VLR removes an entry for the mobile unit and sends a deregister mobile subscriber message to the HLR at 812. The deregister mobile subscriber message may take the form of a MAP/D Deregister Mobile Subscriber <IMSI> message. The HLR, in response, deregisters the mobile unit and transmits a deregister accepted message to the VLR at 814. The deregister acknowledge message may take the form of a MAP/D Deregister Accepted message. In response, the VLR sends a detach acknowledge message to the serving MSC at 816. The detach acknowledge message may take the form of a IMAP/B IMSI Detach Acknowledge message.

The serving MSC then sends a clear command to the BSS at 818 which may take the form of a BSSMAP Clear Command message. Once the BSS receives the clear command at 818, the BSS releases the signaling link at 820. Then, at 822, the BSS issues a clear complete message to the dispatching switch (or message router) at 822 which may take the form of a BSSMAP Clear Complete message. At 824, the dispatching switch (or message router) then terminates the transparent call with the serving MSC. The dispatching switch (or message router) then sends a clear complete message to the serving MSC which may take the form of a BSSMAP Clear Complete message at 826.

Figure 9:
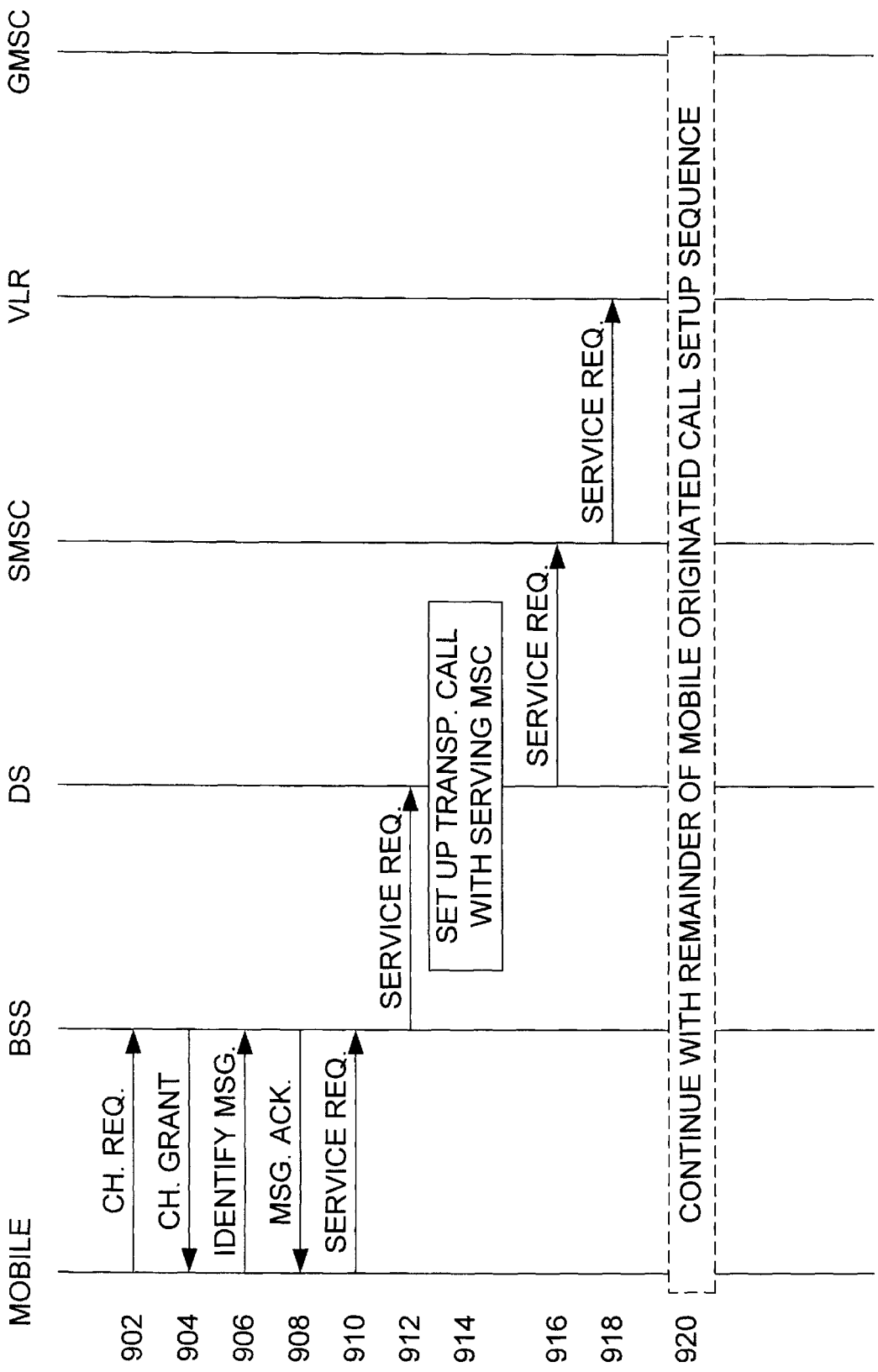
FIG. 9 is a message flow diagram illustrating the flow of messages among the components of a wireless communication system constructed according to the present invention in setting up a mobile unit originated call.

FIG. 9 is a message flow diagram illustrating the flow of messages among the components of a wireless communication system constructed according to the present invention in setting up a mobile unit originated call. Upon pressing the SEND button of a mobile unit, the mobile unit transmits a channel request to the BSS on the Random Access Channel (RACH) at 902. The channel request may take the form of a RIL3-RR-Channel Request message. In response, the BSS sends a channel grant message at 904, which may be an RIL3-RR-IMM SABM message on the Access Grant Channel (AGC). With a Stand-alone Dedicated Control Channel (SDCCH) allocated to the mobile unit, the mobile unit sends an identity of message to the BSS on the SDCCH uplink at 906. In response, the BSS sends a message acknowledge (UA) to the mobile unit on the SDCCH downlink at 908. The mobile unit then sends a service request message to the BSS at 910. The service request message may be a Service Request TMSI, Call Setup message on the SDCCH uplink.

The BSS then sends a service request message to the dispatching switch (or message router) at 912. The service request message may be a Service Request TMSI, Call Setup message. The dispatching switch (or message router) then sets up a transparent path to the serving MSC at 914, the identity of the serving MSC determined using the identity of the mobile unit via an access of the addressing table. In an implementation including a message router, the message router determines the serving MSC of the mobile unit based on the temporary ID of the mobile unit obtained from the message header. Thus, for the message router implementation, no addressing table lookup is required. Once this transparent path has been established, traffic and messages flow between the BSS and the serving MSC without interference of the dispatching switch (or message router).

The dispatching switch (or message router) next sends a service request to the serving MSC at 916. The service request may be a Service Request TMSI, Call Setup message. The serving MSC then sends a service request to the VLR of the serving MSC at 918. The service request may be a MAP/B Service Request TMSI, Call Setup message. Once these operations are complete, the remainder of the mobile originated call setup sequence is accomplished according to known operations. However, as compared to prior operation, the dispatching switch services the call once it is originated via the transparent call with the serving MSC.

Figure 10:
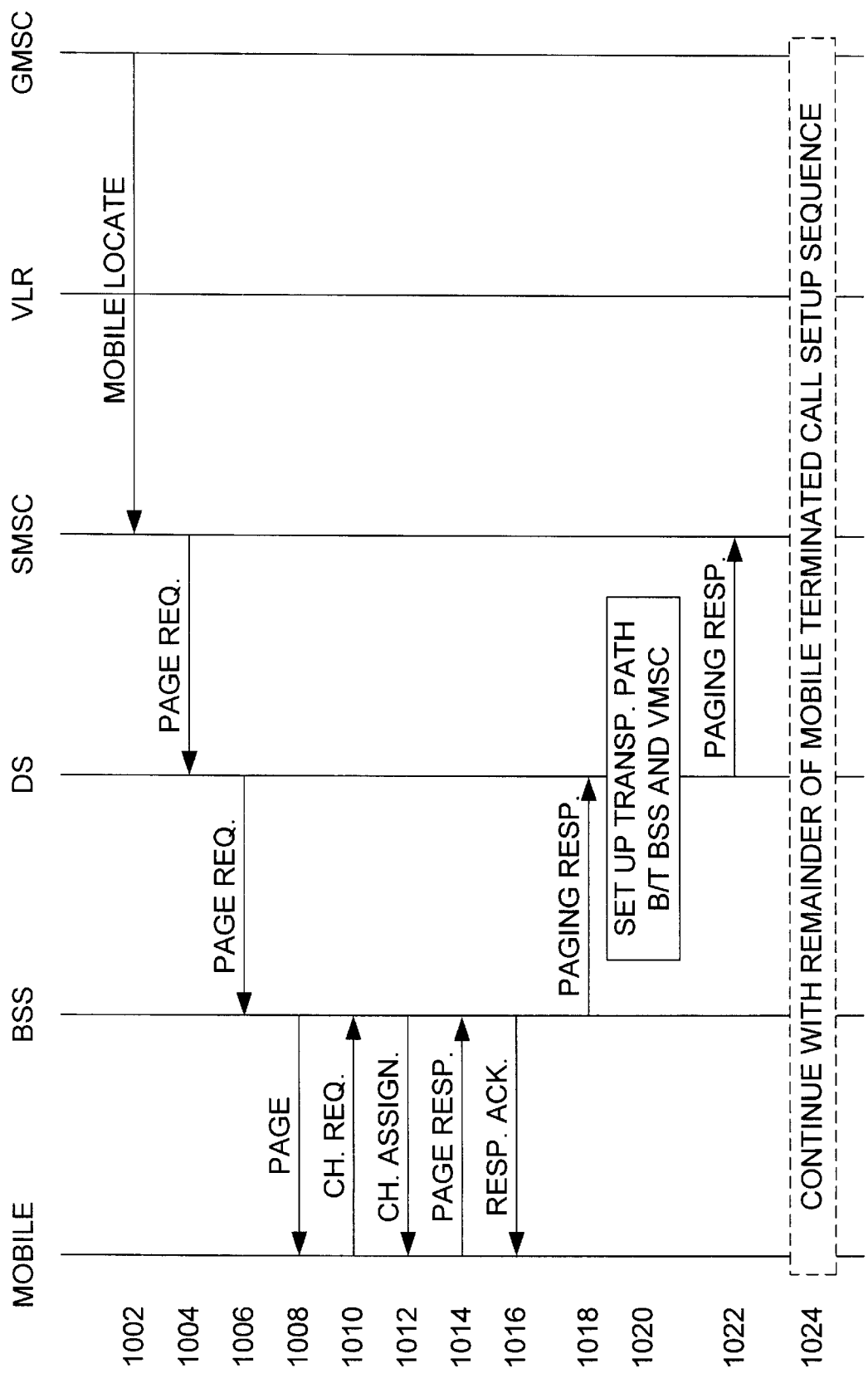
FIG. 10 is a message flow diagram illustrating the flow of messages among the components of a wireless communication system constructed according to the present invention in setting up a mobile terminated call.

FIG. 10 is a message flow diagram illustrating the flow of messages among the components of a wireless communication system constructed according to the present invention in setting up a mobile terminated call. A mobile locate message is generated by the gateway MSC upon receipt of a call from the PSTN. The gateway MSC sends the mobile locate message to the serving MSC at 1002, the gateway MSC having determined the identity of the serving MSC upon access of the HLR. The mobile locate message may be an IAM <MSRN> message.

The serving MSC then sends a page request to the dispatching switch at 1004 which may be a BSSMAP paging <TMSI, BSC_List, Cell_List> message. The dispatching switch (or message router) then sends a page request to the BSS at 1006 which may be a BSSMAP paging <TMSI> message. The BSS then pages the mobile unit at 1008. The page may be of the form RIL3-RR-Page Request <TMSI>. In response to the page, the mobile unit makes a channel request at 1010 which may be a RIL3-RR-Channel Request on the RACH. The BSS then sends a channel assignment message to the mobile unit at 1012 which may be an RIL3-RR-IMM Assigned message on the AGCH. The mobile unit then sends a page response message to the BSS at 1014 which may be a SABM Page response message on the SDCCH Uplink. The BSS then sends a response acknowledge message at 1016 which may be a SABM Page Response Acknowledge message.

The BSS then sends a paging response message to the dispatching switch (or message router) at 1018. Then, at 1020, based upon the identity of the mobile unit, the dispatching switch (or message router) accesses its addressing table to determine the identity of the serving MSC. Once the identity of the serving MSC is determined, the dispatching switch (or message router) sets up a transparent path between the BSS and the serving MSC at 1020. Then, at 1022, the dispatching switch (or message router) sends a paging response to the serving MSC. Once the path between the BSS and the serving MSC has been established, the system continues with the remainder of the mobile terminated call setup sequence.

The operations described with reference to FIGS. 7 through 10 presuppose the existence of a dispatching switch (or message router) as an intermediary entity between the BSS and the serving MSC. Such a structure was illustrated in FIGS. 1, 2 and 4. However, a differing structure was described with reference to FIGS. 3, 5A and 5B which routed traffic/messages over a network and which optionally included a dispatching switch as a separate element. In such a network based structure, the messages described with reference to FIGS. 7 through 10 may be routed over the network between the BSS and the serving MSC using the network routing methodology described with reference to FIGS. 3, 5A and 5B without requiring a dispatching switch (or message router) to form a segment of the routing path.

Figure 11:
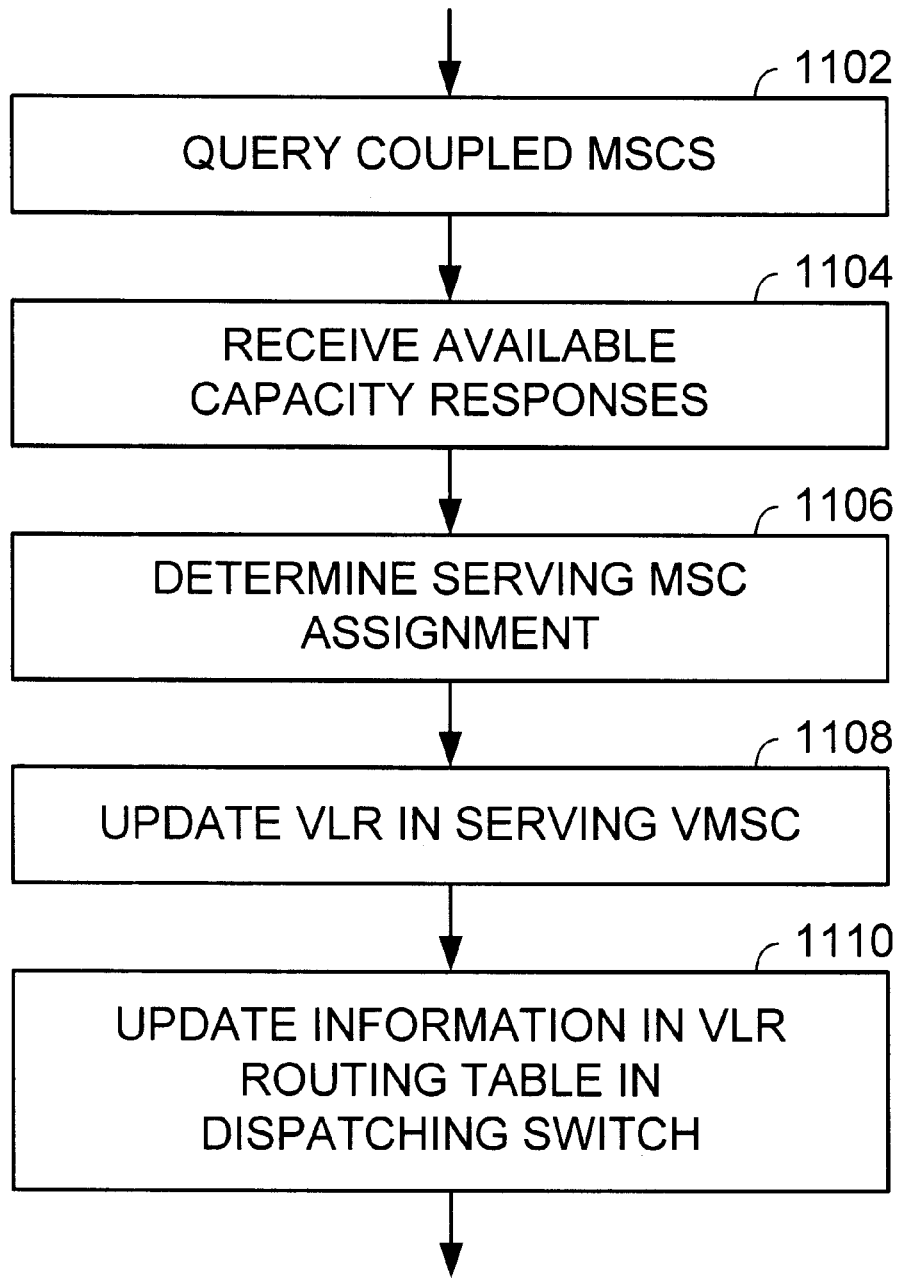
FIG. 11 is a logic diagram illustrating operation of a wireless communication system constructed according to the present invention in allocating mobile units to a plurality of MSCs serving the wireless communication system.

FIG. 11 is a logic diagram illustrating operation of a wireless communication system constructed according to the present invention in allocating a mobile unit to one of a plurality of MSCs serving the wireless communication system based upon immediate query of coupled MSCs. Operation commences at step 1102 wherein the dispatching switch (or message router) queries the coupled MSCs for loading information. The MSCs respond to the dispatching switch (or message router) and the dispatching switch receives the capacity responses at step 1104.

Based upon the responses which indicate loading levels of the MSCs, the dispatching switch (or message router) determines a serving MSC for the mobile unit at step 1106. After determining the serving MSC, the dispatching switch (or message router) directs the serving MSC to update its VLR at step 1108 to indicate that the mobile unit has been assigned to the MSC. The serving MSC, in turn, notifies the HLR to update its entry for the mobile unit to identify the serving MSC. Then, at step 1110, the dispatching switch updates its addressing table to cross-reference the serving MSC to the mobile unit. In an implementation including a message router, as compared to a dispatching switch, no addressing table is required. Based upon the update, in subsequent operations, the dispatching switch will route traffic/messages between the mobile unit and the serving MSC.

In another operation according to the present invention, the MSCs are periodically queried to determine their loading levels. Such an operation would perform steps 1102 and 1104 only. Then, subsequent operation in assigning mobile units to MSCs is based upon the results of the query. Because loading levels typically do not vary drastically over short periods of time, a query interval of 15 minutes may be used in many cases.

Figure 12:
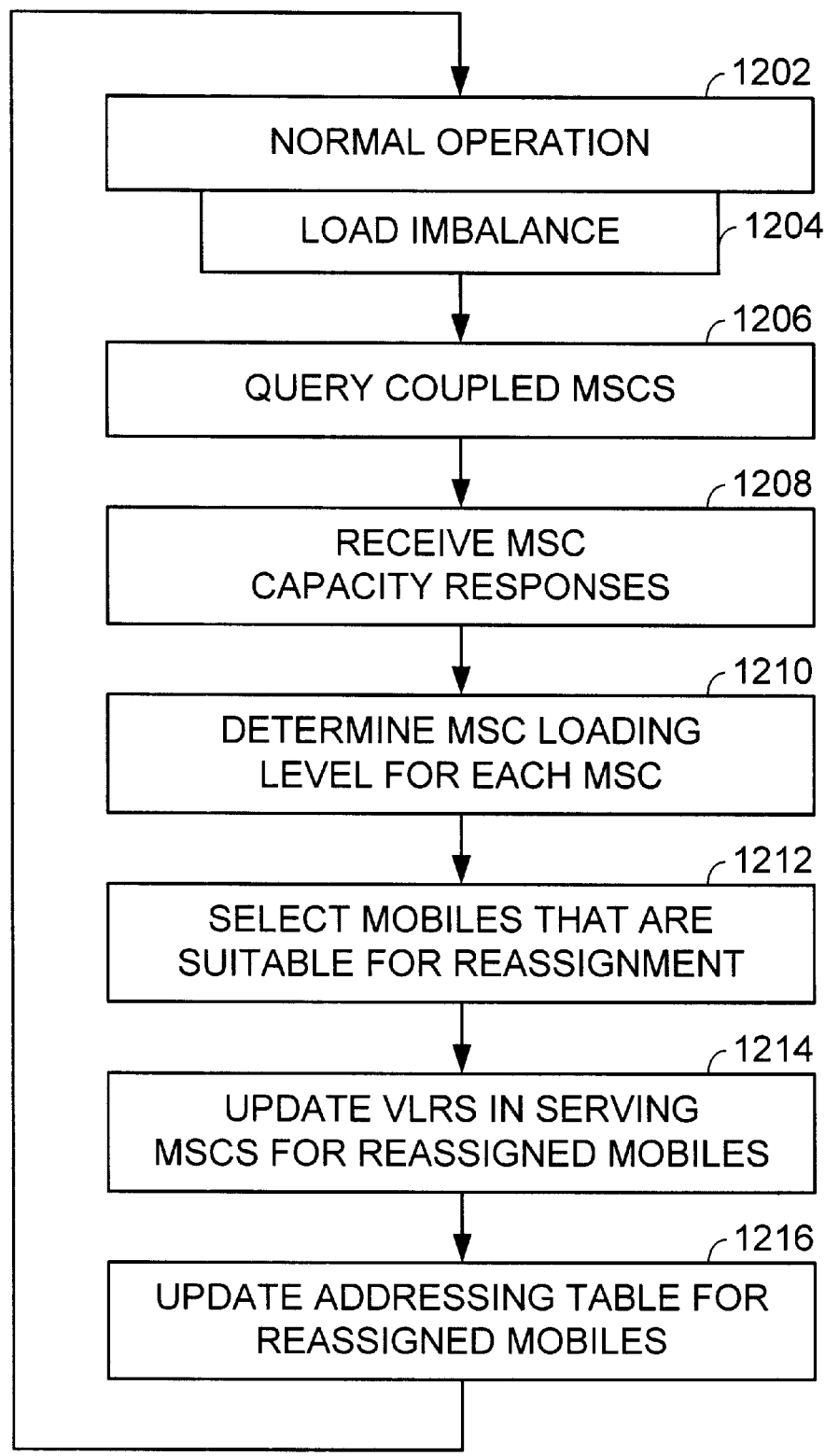
FIG. 12 is a logic diagram illustrating operation of a wireless communication system constructed according to the present invention in reallocating mobile units to a plurality of MSCs serving the wireless communication system.

FIG. 12 is a logic diagram illustrating operation of a wireless communication system constructed according to the present invention in reallocating mobile units among a plurality of MSCs serving the wireless communication system. Operation commences at step 1202 wherein normal operation continues until a load imbalance among the plurality of MSCs is determined. Since a goal in operating a system constructed according to the present invention is to equally load the plurality of MSCs, when the load becomes imbalanced, as determined at step 1204, rebalancing is performed. The dispatching switch (or message router) may determine the relative loading of the MSCs based upon a review of the contents of its addressing table.

At step 1206, the dispatching switch (or message router) queries the plurality of MSCs to determine their excess capacity. The MSCs determine their excess capacity and respond to the dispatching switch (or message router) at step 1208. Based upon the responses received from the MSCs, the dispatching switch (or message router) determines the current MSC loading level for each responding MSC and the optimum loading for each of the MSCs at step 1210. Then, at step 1212, based upon the contents of its addressing table, the dispatching switch (or message router) selects mobile units that are suitable for reassignment to differing base stations. In a typical operation, mobile units currently having calls serviced by the system are considered not suitable for reassignment.

For those mobile units that are selected for reassignment to differing serving MSCs, the VLRs of the MSCs are updated at step 1214 to indicate the new mobile unit assignments. The HLR is then updated to reflect the new serving MSCs for the mobile units that have been reassigned. Then, at step 1216, the addressing table is updated for the reassigned mobile units to indicate the new assignments. After completion of step 1216, operation returns to step 1202. After execution of the steps illustrated in FIG. 12, the MSCs of the system are substantially equally loaded.

In a message router implementation, for routing using a temporary ID, reassigning mobile units to another MSC also requires the reallocation of a new temporary ID to the mobile unit. This new temporary ID indicates the new serving MSC of the mobile unit. However, no table update is necessary at the message router.

Figure 13:
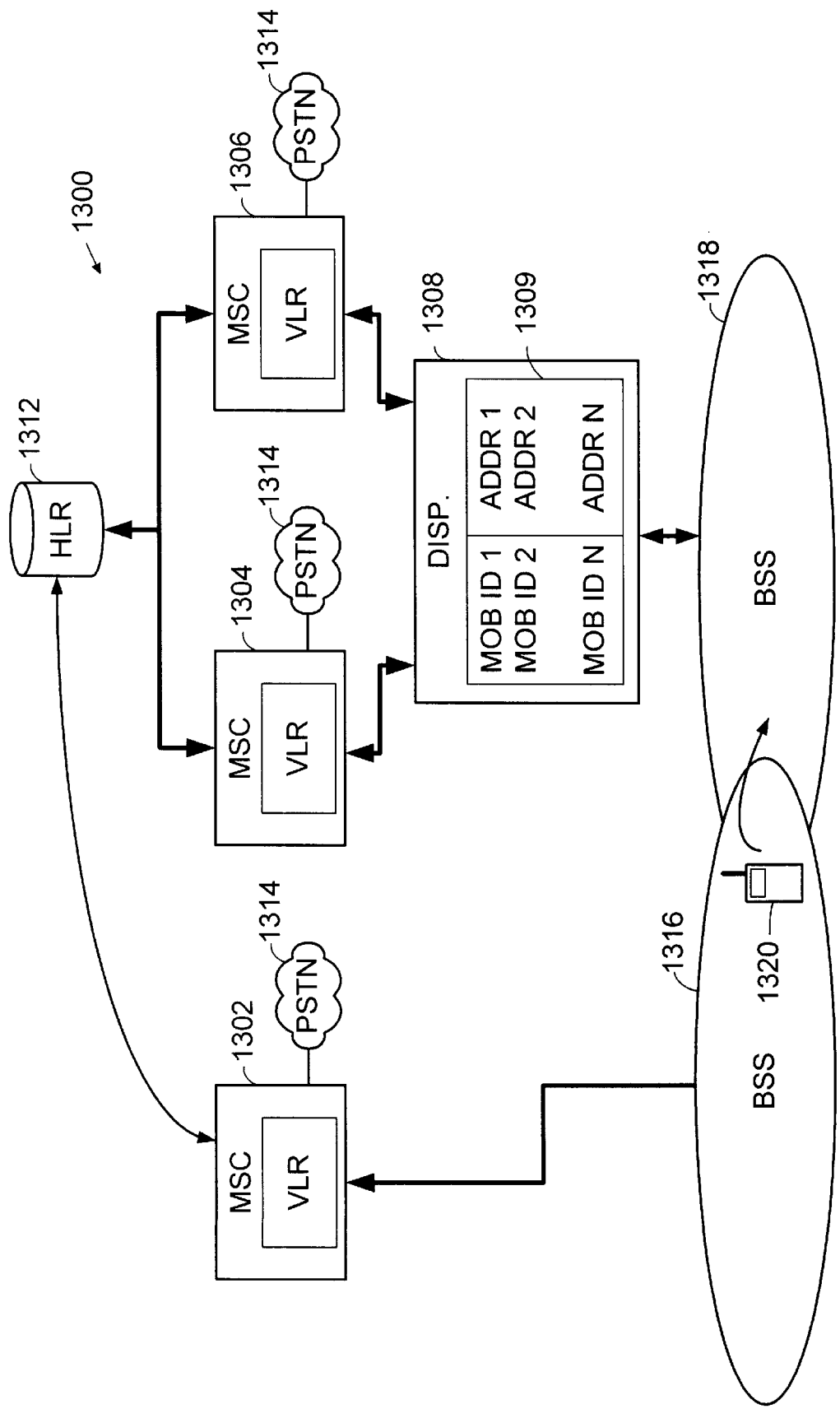
FIG. 13 is a system diagram illustrating a wireless communication system constructed according to the present invention and an adjacent wireless communication system.

FIG. 13 is a system diagram illustrating a wireless communication system 1300 constructed according to the present invention and an adjacent wireless communication system constructed according to prior techniques. As shown, the system 1300 includes MSCs 1304 and 1306 coupled to a BSS 1318 via a dispatching switch 1308 (or message router) with both of the MSCs 1304 and 1306 including a VLR. Each of the MSCs 1304 and 1306 is coupled to the PSTN and an HLR 1312. The dispatching switch includes an addressing table 1309. The message router does not include an addressing table. The adjacent system includes an MSC 1302 having a VLR that is coupled to the PSTN 1314 and to a BSS 1316.

When a mobile unit 1320 being served by the adjacent system moves to be within the service area of the system 1300, service by the system 1300 is initiated. Such service is established according to the operation described with reference to FIG. 7. In such operation, the mobile unit 1320 is assigned to MSC 1304 or MSC 1306 based upon loading levels of the MSCs. Then, subsequent traffic/messages are routed by the dispatching switch 1308 according to the assignment. When the mobile unit 1320 moves into the service area of the system 1300 during an ongoing call, handover to the system 1300 is performed according to the operation of FIG. 7 as well as prior handover operations so that the call will continue to be serviced.

When the mobile unit 1320 moves from being served by the system 1300 to the adjacent system, operation occurs according to prior techniques in handover from one system to another system. However, these operations may be altered to coincide with the assignment of the mobile unit 1320 to a serving MSC, either MSC 1304 or MSC 1306 and traffic/messages being routed via the dispatching switch 1308.

Figure 14:
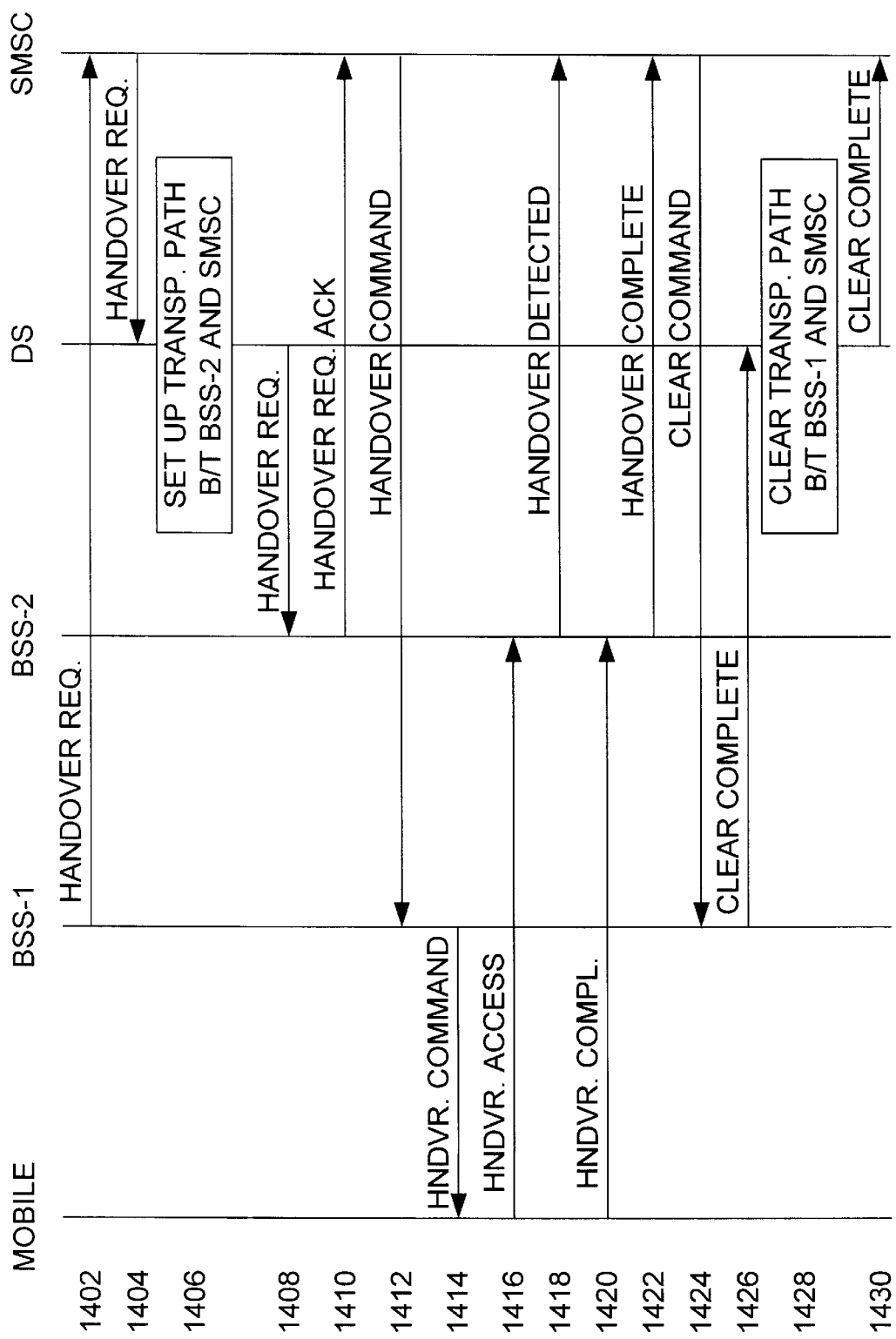
FIG. 14 is a message flow diagram illustrating the flow of messages among the components of a wireless communication system constructed according to the present invention in handing over a mobile unit between BSCs served by the system.

FIG. 14 is a message flow diagram illustrating the flow of messages among the components of a wireless communication system constructed according to the present invention during a handover between BSCs served by the system. At 1402, BSS-1 sends a handover message to the serving MSC, requesting handover to BSS-2. Then at 1404, the serving MSC sends the handover request to the dispatching switch (or message router), requesting handover to BSS-2. In response, the dispatching switch (or message router) sets up a transparent path at 1406 between BSS-2 and the serving MSC to service subsequent traffic/messages. Then, at 1408, the dispatching switch (or message router) passes the handover request to BSS-2 via a portion of the transparent connection.

BSS-2 then responds to the serving MSC with a handover request acknowledgment message at 1410. With the connections established, the serving MSC sends a handover command to BSS-1 at 1412 and BSS-1 sends the handover command to the mobile unit at 1414. Upon receipt of the handover command, the mobile unit sends a handover access message to BSS-2 at 1416. BSS-2 then sends a handover detected message to the serving MSC at 1418.

When the mobile unit completes its handover operation to BSS-2, the mobile unit sends a handover complete message to BSS-2 at 1420. Then, BSS-2 sends a handover complete message to the serving MSC at 1422. With the handover completed, the serving MSC sends a clear command to BSS-1 at 1424. In response, BSS-1 sends a clear complete message to the dispatching switch at 1426. Then, at 1428, with the handover verified complete, the dispatching switch (or message router) clears the transparent path between BSS-1 and the serving MSC it had previously established to service traffic/messages between BSS-1 and the serving MSC. After clearing the transparent path between BSS-1 and the serving MSC, the dispatching switch (or message router) sends a clear complete message to the serving MSC indicating that the path is cleared.

Figure 15:
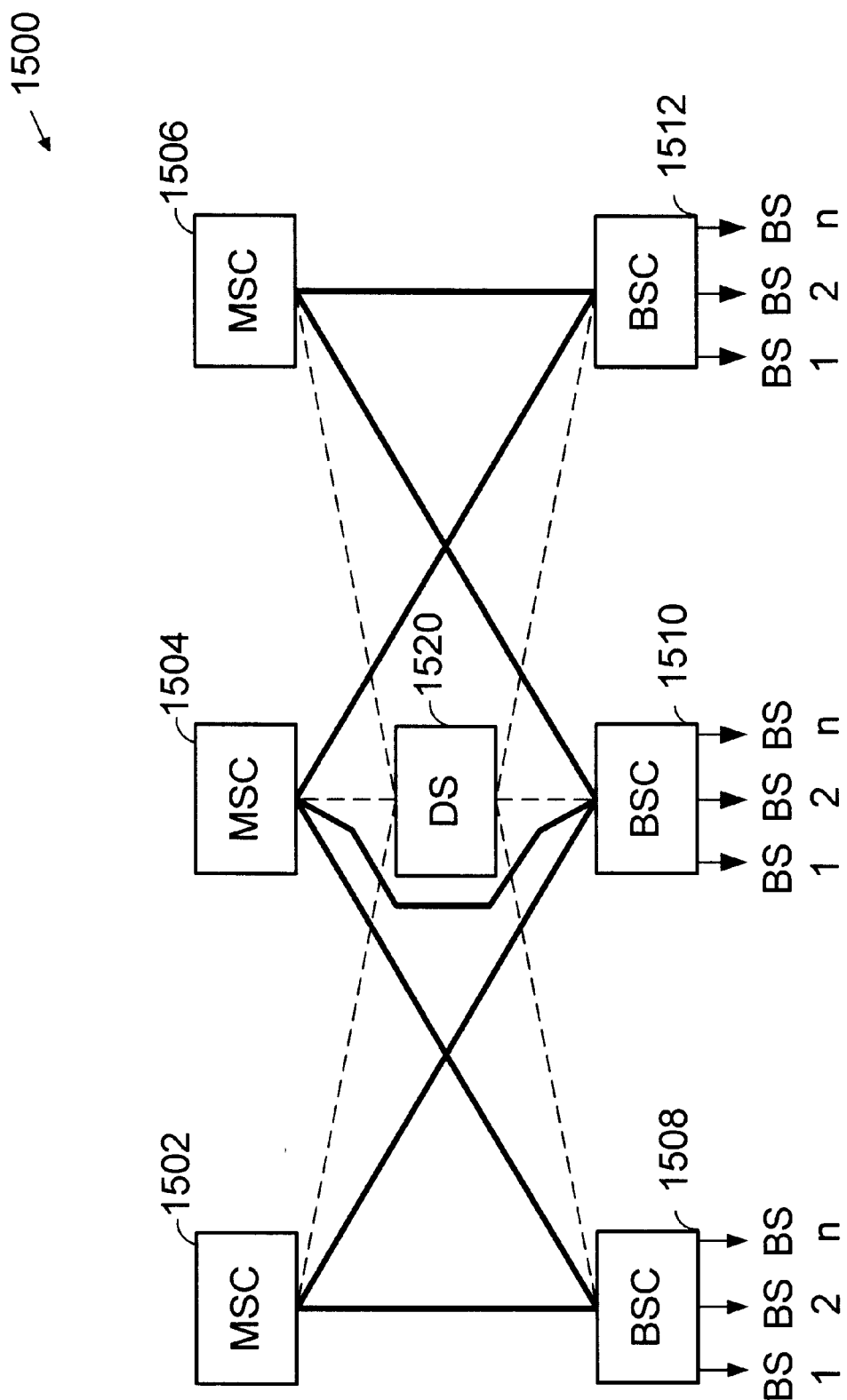
FIG. 15 is a system diagram illustrating an alternate system construction according to the present invention with separate traffic and signaling connections.

FIG. 15 is a system diagram illustrating an alternate system 1500 construction according to the present invention with separate traffic and signaling connections. As shown, the system includes MSCs 1502, 1504 and 1506, BSCs 1508, 1510 and 1512 and a dispatching switch 1520. Each of the BSCs 1508, 1510 and 1512 is coupled to each MSC 1502, 1504 and 1506 by a traffic network connection (as illustrated as solid lines). Further each of the MSCs 1502, 1504 and 1506 and each of the BSCs 1508, 1510 and 1512 are coupled to the dispatching switch 1520 by signaling network connections (as illustrated as dashed lines).

In its operation, the dispatching switch 1520 routes no traffic. However, the dispatching switch sets up and signals the control of all traffic passing between the BSCs 1508, 1510 and 1512 and the MSCs 1502, 1504 and 1506. Thus, the dispatching switch 1520 must operate intimately in control of the traffic network. Techniques generally known may be combined with the teachings described herein to facilitate such operation.

In another embodiment, the dispatching switch is replaced by a message router. In such implementation, the message router performs operations previously described herein in routing signaling messages and in assigning mobile units to the MSCs 1502, 1504 and 1506.

Figure 16:
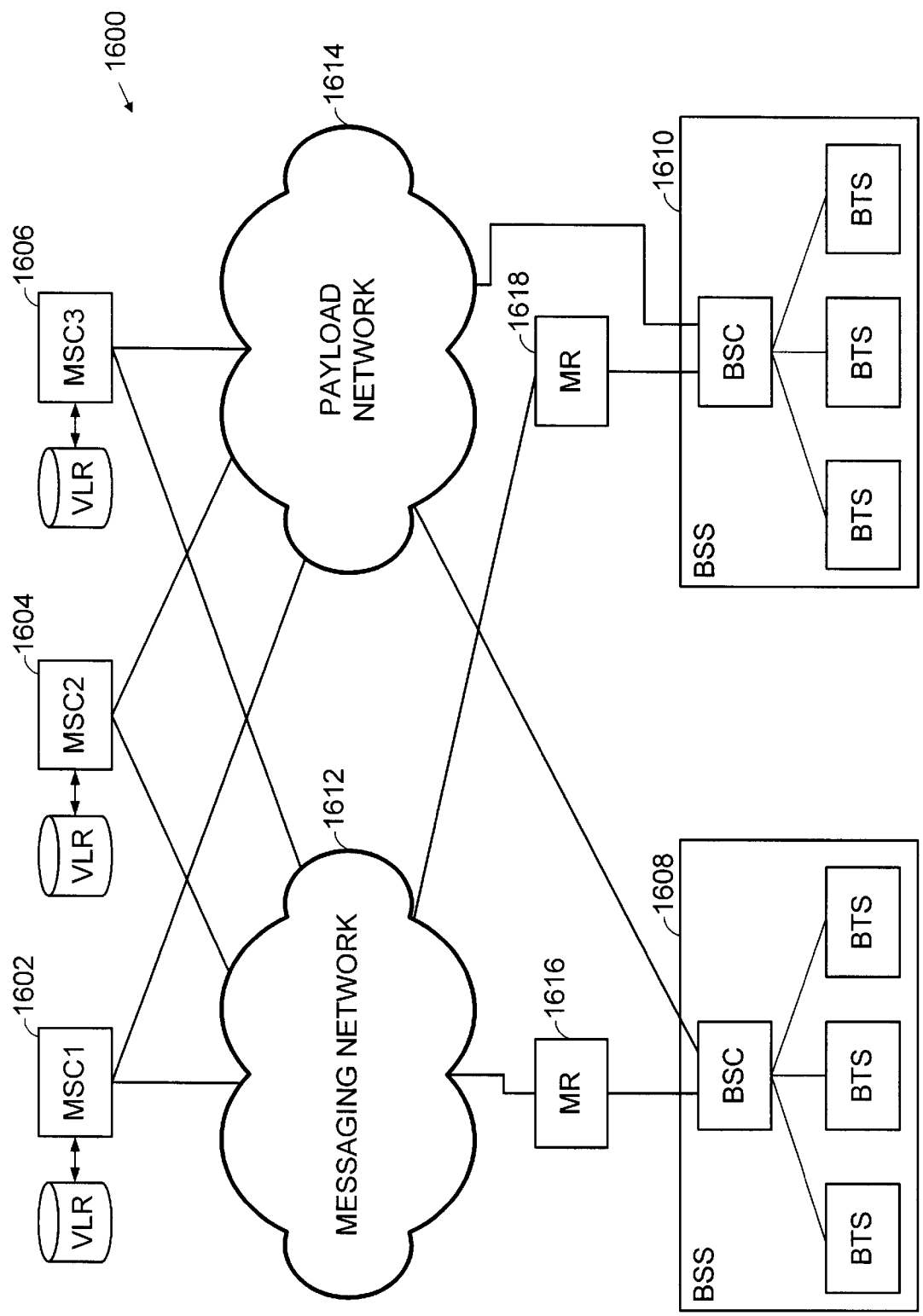
FIG. 16 is a system diagram illustrating a wireless communication system constructed according to the present invention in which message routers route signaling messages between a plurality of base station subsystems and a plurality of mobile switching centers.

FIG. 16 is a system diagram illustrating a wireless communication system 1600 constructed according to the present invention in which message routers 1616 and 1618 route signaling messages between a plurality of base station subsystems 1608 and 1610 and a plurality of mobile switching centers 1602, 1604 and 1606. As is shown, each of the base station subsystems 1608 and 1610 includes a BSC and a plurality of BTSs. Further, each MSC includes an associated VLR.

A messaging network 1612 serves to route signaling messages between the BSSs 1608 and 1610 and the MSCs 1602, 1604 and 1606 via the message routers 1616 and 1618. A payload network 1614 serves to route user traffic between the BSSs 1608 and 1610 and the MSCs 1602, 1604 and 1606. The signaling message routing methodology of the present invention allows the implementation of the distributed network architecture of FIG. 16. As has been previously described, however, the message routers 1616 and 1618 do not route user traffic. Thus, user traffic is routed between the payload network 1614 and the BSSs 1608 and 1610 without being routed through the message routers 1616 and 1618. Such construction differs from that in which dispatching switches are employed and in which user traffic is routed through the dispatching switches.

This network architecture shows the logical aspects of the message router function. The message router function can be implemented as a centralized, stand-along manner in which the MSCs and BSCs are coupled via the message router. Alternatively, the message router function can be implemented as part of the MSC, or part of the BSC. In network architectures where a network is used to couple the BSCs and the MSCs, the message router function can be implemented as part of the network functions.

In operation of the system 1600, temporary IDs of mobile units indicate which MSC 1602, 1604 or 1606 serves the mobile unit. Thus, when the mobile unit sends a signaling message to its MSC via a serving BSS and the messaging network 1612, the serving message router 1608 or 1610 routes the signaling message to the appropriate MSC (1602, 1604 or 1606). If the signaling message requests call setup, the serving MSC (1602, 1604 or 1606) then sets up a communication path to the mobile station across the payload network 1614.

Figure 17:
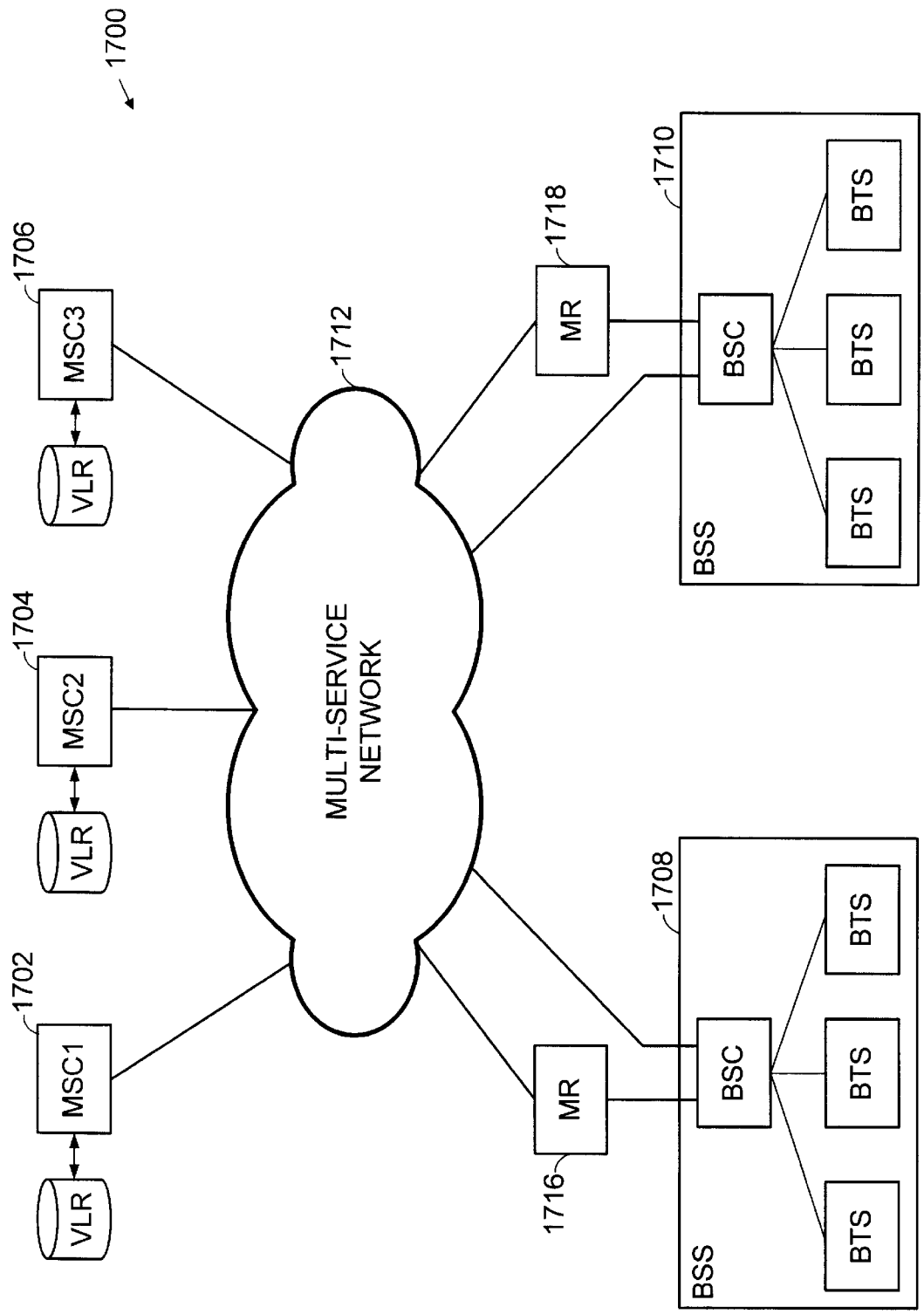
FIG. 17 is a system diagram illustrating another wireless communication system constructed according to the present invention in which message routers route signaling messages between a plurality of base station subsystems and a plurality of mobile switching centers.

FIG. 17 is a system diagram illustrating another wireless communication system 1700 constructed according to the present invention in which message routers 1716 and 1718 route signaling messages between a plurality of base station subsystems 1708 and 1710 and a plurality of mobile switching centers 1702, 1704 and 1706.

As compared to the structure of FIG. 16, the messaging network 1612 and the payload network 1614 are combined into a single network, a multi-service network 1712 that carries both signaling messages and user traffic. In another embodiment, an ATM network could also be used to carry both the signaling messages and user traffic, serving as the multi-service network 1712. Thus, the BSSs 1708 and 1710 couple (via respective BSCs) to message routers 1716 and 1718, respectively, and also to the multi-service network 1712. While signaling messages are routed via the message routers 1716 and 1718, user traffic is routed directly between the BSCs and the multi-service network 1712.

Based on the architecture of FIGS. 16 and 17, there is no one-to-one relationship between a BSC and an MSC. All BSCs can communicate with all MSCs in the network, and vice versa. A subscriber currently in the area of a particular BSC can be supported by any MSC in the network. Since the mobile units are permanently associated with a particular MSC, no inter-MSC location update and handover is necessary as long as the mobile unit stays within the service area of the wireless communication system. As a result, location management costs are reduced significantly. Further, increasing the number of MSCs in the network will not result in an increase in location management cost. More MSCs can be added to the network as the capacity requirement increases without major capacity degradation. Moreover, using the message router methodology no routing database is necessary and the number of message routers can be increased as needed. The network capacity is therefore not limited by the processing power of a central bottleneck.

The elimination of inter-MSC location update and handover results in lower processing load at the MSCs and HLR. More processing power can be allocated for processing calls and HLR queries. This results in an increase in the network capacity. Such increased system capacity may provide a 25% capacity improvement over prior network architectures.

In the network architecture of FIGS. 16 and 17, each location may be covered by more than one MSC. As a result, the failure of an MSC will not lead to the outage of wireless coverage in a particular location. When a MSC fails, the signaling messages of its associated mobile units can be re-routed to one of the other working MSCs. As a result, no subscriber will experience an outage in wireless service. Safeguard operations may be implemented in the message routers 1608, 1610, 1708 and 1710 to accommodate MSC failures and cause mobile units to register with operating MSCs should the serving MSC of the mobile units fail.

Since any of the MSCs in the network can serve a particular mobile unit, load-balancing mechanisms can be implemented in the message routers (1608, 1610, 1708 and 1710) to balance the processing load in the MSCs in the network. This results in higher utilization of network resources.

Figure 18:
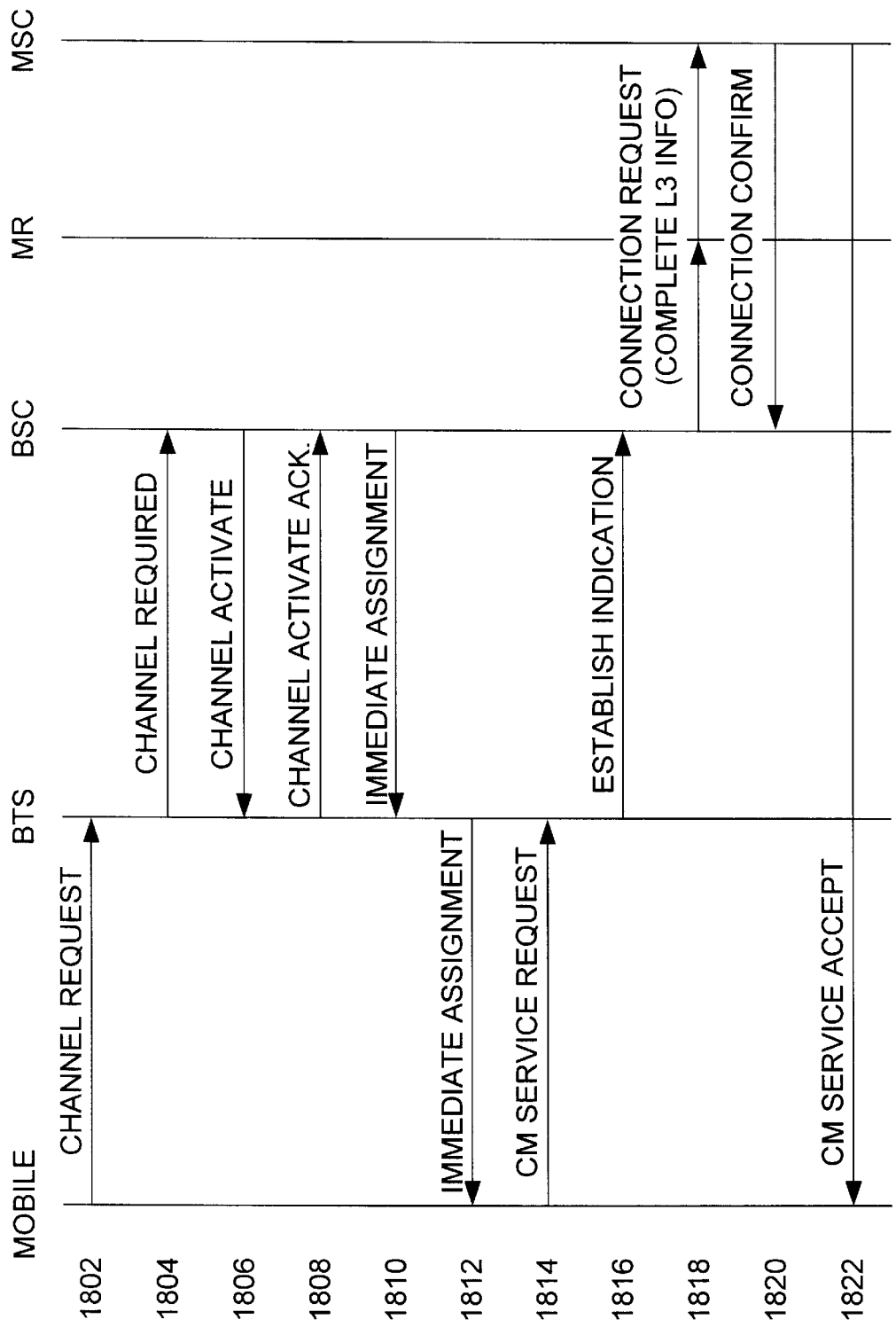
FIG. 18 is a message flow diagram illustrating the flow of messages among the components of a wireless communication system constructed according to the present invention that includes a message router when a mobile unit initially registers within the system.

FIG. 18 is a message flow diagram illustrating the flow of messages among the components of a wireless communication system constructed according to the present invention that includes a message router when a mobile unit initially registers within the system. In GSM, an mobile unit initiates the exchange of signaling messages with its serving MSC whenever it requires a specific service from the MSC. These services include location update, IMSI attach and detach, call setup, response to paging, short messages transmission, and supplementary service management, among others.

However, before signaling messages can be exchanged between the mobile unit and the MSC, the mobile unit must initiate an immediate assignment procedure. The purpose of the immediate assignment procedure is to allocate a wireless signaling channel between the mobile unit and the BTS/BSC and a transparent call, referred to as the SCCP connection, between the BSC and the MSC. This procedure results in a signaling path between the mobile unit and the MSC which can then be used for the transmission of signaling messages. The immediate assignment procedure is initiated by the mobile unit. However, the MSC can trigger the mobile unit to initiate the immediate assignment procedure by sending a paging signal to the mobile unit.

FIG. 18 illustrates the message flow when a mobile unit initiates the immediate assignment procedure. At 1802, the mobile unit initiates the immediate assignment procedure by sending a CHANNEL_REQUEST message to the BTS which serves the cell in which the mobile unit currently operates. At 1802, the BTS sends a CHANNEL_REQUIRED message to its serving BSC. If the request is successful, at 1806, the BSC responds with a CHANNEL_ACTIVATE message which directs the BTS to activate a channel based upon the request. At 1808 the BTS responds to the BSC with a CHANNEL_ACTIVATE_ACK message, acknowledging receipt of the CHANNEL_ACTIVATE message. The BSC then sends an IMMEDIATE_ASSIGNMENT message to the BTS at 1810 which relays the IMMEDIATE_ASSIGNMENT message to the mobile unit at 1812.

Next, the mobile unit sends the first layer 3 signaling message referred to here as the "initial" message to the BSC via the BTS. There are four possible initial messages in GSM: PAGING_RESPONSE, LOCATION_UPDATE_REQUEST, IMSI_DETACH, and CM_SERVICE_REQUEST. The mobile unit sends a PAGING_RESPONSE message to the MSC when it receives a paging signal from the MSC. The mobile unit sends the LOCATION_UPDATE_REQUEST to the MSC to request for normal or periodic location update, and IMSI attach. The mobile unit sends the IMSI_DETACH to the MSC when the mobile unit tries to detach from the network. Finally, the mobile unit sends the CM_SERVICE_REQUEST to the MSC when the mobile unit requests a call set up, short message transmission, supplementary service management or other service (as shown at 1814). On receiving the initial message at 1814, the BTS sends an ESTABLISH_INDICATION to the BSC at 1816 and the BSC realizes that this is this first message in a series of signaling messages and attempts to set up a SCCP connection to the MSC.

According to the present invention, different subscribers in the same BSC coverage area may be served by different MSCs. As a result, all messages between the BSC and the MSC are first routed to the message router. At 1818 the BSC sends a CONNECTION_REQUEST via the message router to the MSC. To allow the routing of the initial messages from the BSC to the MSC without relying on routing database lookup routers, the message router forwards signaling message from the BSC to the MSC using the TMSI number of the mobile unit as a routing address.

In order to embed the information about the serving MSC in the TMSI of the mobile unit, all the available TMSI numbers in the network are partitioned into n groups. Where n is the number of MSCs in the network. Each MSC is assigned one group of TMSI values. The MSC is free to allocate its assigned TMSIs to its supported mobile units. Furthermore, each four-byte TMSI is divided into two portions, denoted by x.y. The first portion, x, is used as a MSC identifier. When the router receives an initial message from the mobile unit, it first extracts the TMSI value from the message header and forwards the message to the MSC as identified by the first portion of the TMSI. The second portion of the TMSI, y, is used to identify the mobile unit within the MSC service area and is assigned by the MSC.

When the MSC receives a signaling message from the mobile unit, it will first extract the TMSI value from the message header and use the TMSI value as an index to locate the subscriber's record in its database. For example a 7-bit MSC identifier allows the network to support of up to 128 MSCs and still provide more than 33 million unique TMSI values for each MSC.

In an initial assignment at 1818, the CONNECTION_REQUEST message sent from the BSC to the MSC is intercepted by the router. The router first extracts the TMSI number within the header of the initial message which is piggybacked in the CONNECTION_REQUEST message. The router then sends the message to the appropriate MSC based on the first portion of this TMSI number. Note that the operation at the router is completely transparent to the BSC. The CONNECTION_REQUEST message and its content are not modified by the router. Once the CONNECTION_REQUEST arrives at the MSC, the MSC accepts the connection request and sends a CONNECTION_CONFIRM message at 1820 to the BSC. The MSC then sends a CM_SERVICE_ACCEPT message to the mobile unit at 1822.

There is no need to forward subsequent messages based on the TMSI number of the message. For the duration of this connection, the router acts as a Signal Transfer Point (STP), which forwards messages based on the SCCP destination reference number to and from the BSC. The SCCP connection will be terminated as soon as the service requested by the mobile unit (such as call origination or location update) is complete.

When a connection request is made by a mobile unit that has not yet been assigned a TMSI, the message router routes the message to one of the MSCs based upon a load distribution technique. Such a load distribution technique could be a round-robin assignment or could be based upon actual MSC loading, as determined via periodic interaction with the MSCs. The MSC to which the mobile unit is directed then assigns a TMSI to the mobile unit which is used in subsequent signaling messages.

All initial messages contain the ID of the mobile unit and information about the type of service requested by the mobile unit. Once the MSC receives this initial message, the MSC also sets up an association between the established SCCP connection and the mobile unit. As a result, there is no need to include the mobile unit's TMSI number in subsequent signaling message. When the immediate assignment procedure is complete, a signaling path has been set up between the mobile unit and the MSC. Signaling messages can now be exchanged between the mobile unit and MSC. The MSC flow triggers the appropriate service as requested by the mobile unit. The SCCP connection will be released when the signaling message exchange ends.

Figure 19:
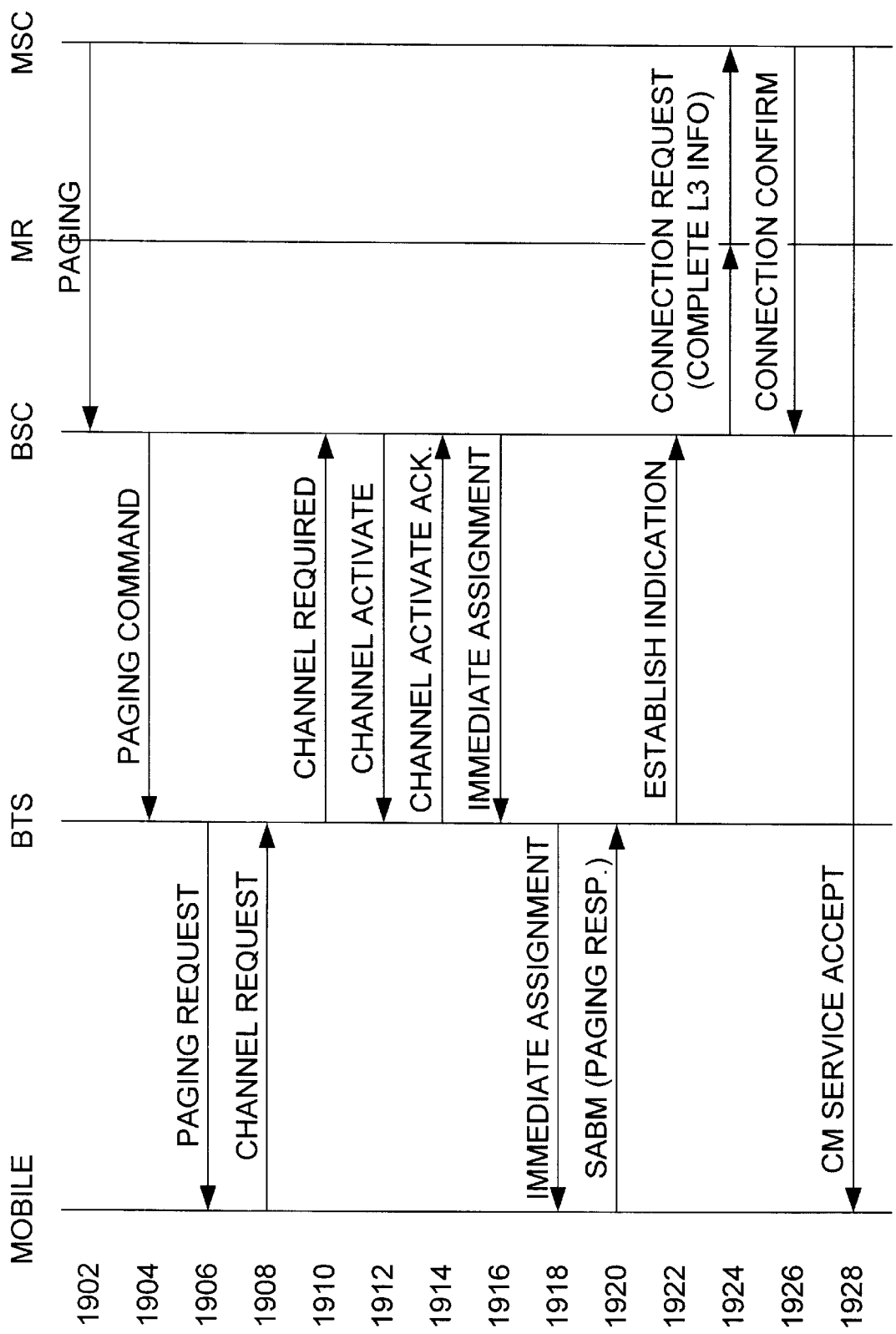
FIG. 19 is a message flow diagram illustrating the flow of messages among the components of a wireless communication system constructed according to the present invention that includes a message router when a mobile switching system pages a mobile unit.

FIG. 19 is a message flow diagram illustrating the flow of messages among the components of a wireless communication system constructed according to the present invention that includes a message router when a mobile switching system pages a mobile unit. In such operation, the MSC initiates a paging of the mobile unit at 1902 by sending a PAGING message to a serving BSC. Such operation assumes a prior registration by the mobile unit with the MSC.

The BSC then sends a PAGING_COMMAND to the mobile unit at 1904. Resultantly, the BTS sends a PAGING_REQUEST to the mobile at 1906. The mobile unit responds to the PAGING_REQUEST with a CHANNEL_REQUEST at 1908. The BTS then sends a CHANNEL_REQUIRED message to the BSC at 1910. At 1912, the BSC sends a CHANNEL_ACTIVATE to the BTS at 1912. The BTS acknowledges such message with a CHANNEL_ACTIVATE_ACK message at 1914. The BSC responds to the BTS with an IMMEDIATE_ASSIGNMENT message at 1916 and relays the IMMEDIATE_ASSIGNMENT message to the mobile unit at 1918.

At 1920, the mobile unit responds with a SABM (PAGING_RESPONSE) message. The BTS, upon receipt of the message from the mobile unit sends an ESTABLISH_INDICATION message to its BSC at 1922. Then, the BSC sends a CONNECTION_REQUEST message to the MSC at 1924. However, the message router intercepts the CONNECTION_REQUEST, and via an investigation of the TMSI contained in the message, routes the CONNECTION_REQUEST to the serving MSC. The MSC responds to the BSC with a CONNECTION_CONFIRM message at 1926 and with a CM_SERVICE_ACCEPT message to the mobile unit at 1928.

Figure 20A:
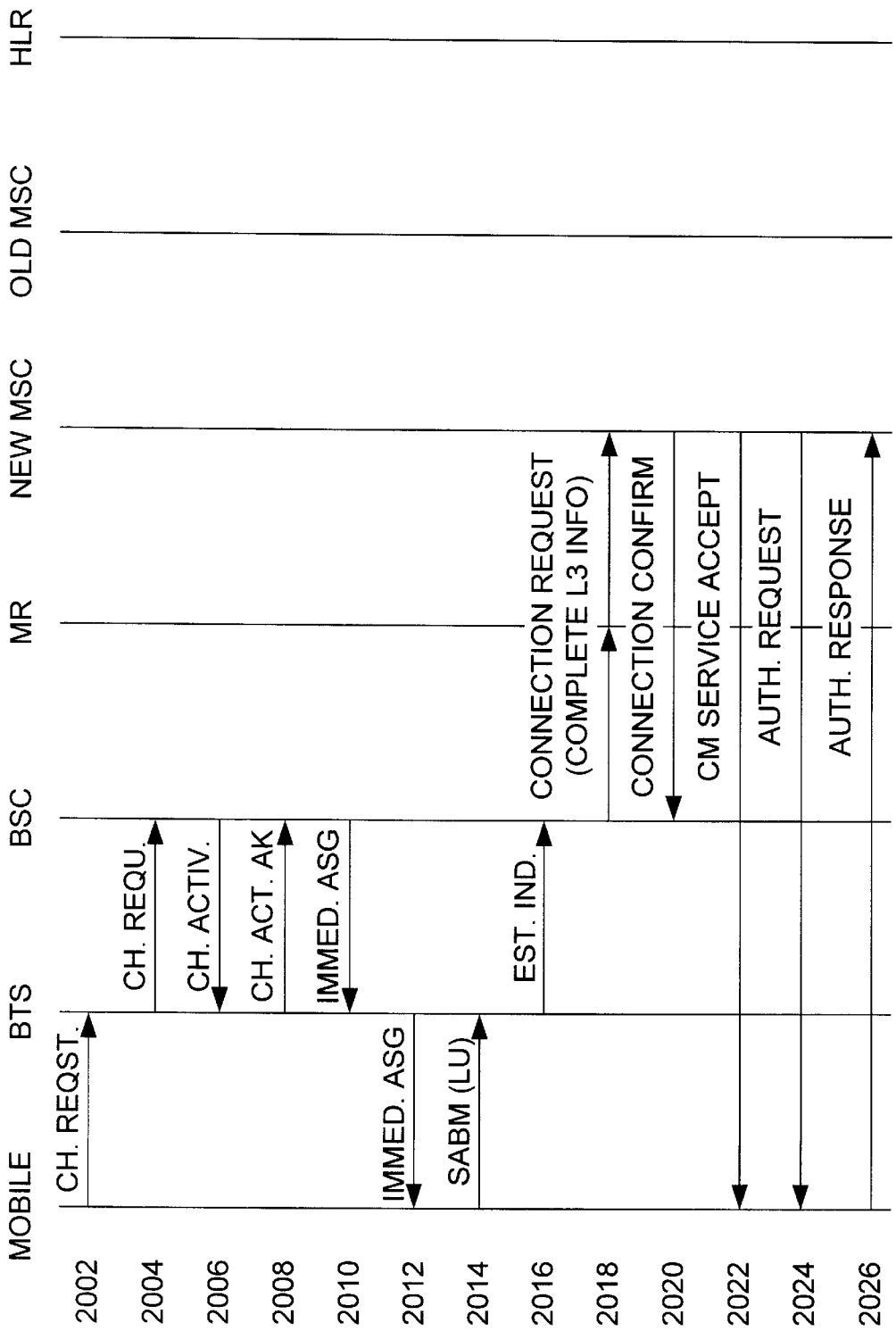
Figure 20B:
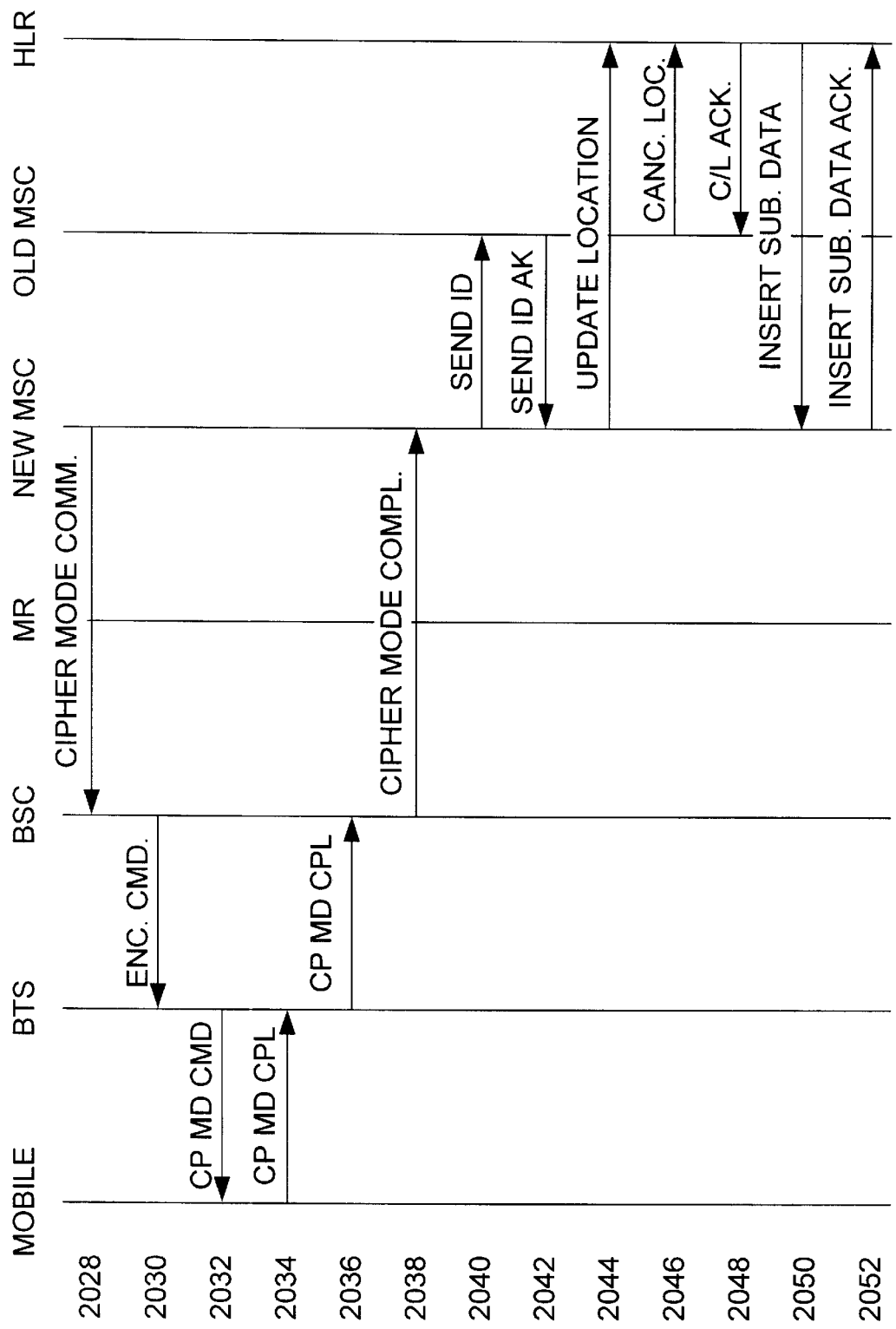

FIGS. 20A, 20B and 20C are message flow diagrams illustrating the flow of messages among the components of a wireless communication system constructed according to the present invention that includes a message router when a mobile station roams into the wireless communication system from a foreign wireless communication system.

Particular problems exist when routing initial messages of an mobile unit that enters the network from a foreign network. First, the mobile unit does not have a TMSI number assigned by the present network. Second, some mobile units elect to use their IMSI or the IMEI numbers instead of the TMSI number as an identifier. FIGS. 20A, 20B and 20C address these problems.

Referring now to FIG. 20A, when a mobile unit enters the network from a foreign network, it first makes a signaling CHANNEL_REQUEST at 2002. The BTS forwards the CHANNEL_REQUEST to its BSC at 2004. The BSC then sends a CHANNEL_ACTIVATE message to the BTS it 2008. The BTS responds with a CHANNEL_ACTIVATE_ACK message at 2008 and the BSC responds with an IMMEDIATE_ASSIGNMENT message at 2010 which is forwarded to the mobile unit at 2012.

The mobile unit initiates an inter-VLR location update by sending an SABM(LOCATION_UPDATE_REQUEST) to its serving BTS at 2014. The BTS responds by sending an ESTABLISH_INDICATION message to its BSC at 2016. When the BSC receives this message, it sends the CONNECTION_REQUEST to the MSC at 2018 with the LOCATION_UPDATE_REQUEST message piggybacked in the CONNECTION_REQUEST message. However, the message router intercepts the CONNECTION_REQUEST message at 2018, and detects that the TMSI does not belong to any MSC in the network. The message router then selects a serving MSC for the mobile unit based on the loading condition of the MSC or by another algorithm and forwards the message to the serving MSC at 2018.

The serving MSC (New MSC) then completes the location update for the mobile unit. The serving MSC also assigns a new TMSI to the mobile unit. The first portion of this new TMSI contains the identity of the serving MSC. The second portion of the new TMSI is assigned by the MSC and identifies the mobile unit. When the mobile unit requests a service (such as a call request or a location update) again at a later time, the message router recognizes that TMSI of the mobile unit belongs to the serving MSC and forwards the CONNECTION_REQUEST message to the serving MSC, as indicated by the first portion of the TMSI.

Alternatively, at 2018, if the mobile unit uses the IMSI or IMEI number in the initial message, the router detects that the IMSI number is not available and will route the CONNECT_REQUEST message to a randomly selected MSC. In a small network that has only a small number of MSCs, there is a non-negligible probability that MSC is the serving MSC of the mobile unit. However, if the MSC is not the serving MSC of the mobile unit, the MSC will first perform an inter-VLR location update for the mobile unit before it provides service to the mobile unit. The inter-VLR location update procedure informs the HLR that MSC is now the new serving MSC for the mobile unit. The HLR will then cancel the registration of the mobile unit at the previous serving MSC of the mobile unit. After the inter-VLR location update, the now serving MSC assigns a new TMSI number to the mobile unit. The router will route all subsequent service requests from this mobile unit to the serving MSC. When the inter-VLR location update is complete and a new TMSI number has been assigned to the mobile unit, the MSC will perform the service as originally requested by the mobile unit.

Proceeding in the example, the New MSC sends a CONNECTION_CONFIRM message to the BSC at 2020 and a CM_SERVICE_ACCEPT message to the mobile unit at 2022. The 2024, the New MSC sends an AUTHENTICATION_REQUEST to the mobile unit. The mob unit then responds at 2026 to the New MSC with an AUTHENTICATION_RESPONSE.

Referring now to FIG. 20B, the New MSC sends a CIPHER_MODE_COMMAND to the BSC at 2028 and, in response, the BSC sends an ENCRYPTION_COMMAND to the BTS serving the mobile unit at 2030. The BTS then sends a CIPHER_MODE_COMMAND to the mobile unit at 2032 and the mobile unit responds to the BTS with a CIPHER_MODE_COMPLETE message to the BSC at 2036. The BSC then sends a CIPHER_MODE_COMPLETE message to the New MSC at 2038.

At 2040 the New MSC sends a SEND_IDENTIFICATION message to the Old MSC of mobile unit. The Old MSC responds with a SEND_IDENTIFICATION_ACK message to the New MSC at 2042. At 2044, the New MSC initiates an inter-VLR location update by sending an UPDATE_LOCATION message to the HLR. The HLR then sends a CANCEL_LOCATION message to the Old MSC at 2046 and the Old MSC responds to the HLR with a CANCEL_LOCATION_ACK at 2048. The HLR then sends an INSERT_SUBSCRIBER_DATA message to the New MSC, instructing the New MSC to insert subscriber data for the mobile unit into the VLR of the New MSC. The New MSC performs such subscriber data insertion and responds to the HLR with an INSERT_SUBSCRIBER_DATA_ACK message.

Referring now to FIG. 20C, the HLR responds to the New MSC with an UPDATE_LOCATION_ACK message at 2054. With the inter-VLR location update completed between the New MSC, the Old MSC and the HLR, the New MSC sends a LOCATION_UPDATE_ACCEPT message to the mobile unit at 2056. The New MSC then sends a TMSI_REALLOCATION message to the mobile unit at 2058 which includes the new TMSI that the mobile unit is to use, such new TMSI identifying the New MSC in further signaling message routing.

The mobile unit responds to the TMSI_REALLOCATION message with a TMSI_REALLOCATION_ACK message at 2060. After the TMSI reallocation is complete, the MSC may perform other functions as requested by the mobile units. After all the requested functions have been performed, the New MSC then sends a CLEAR_COMMAND to the BSC at 2062. The BSC then sends a CHANNEL_RELEASE message to the mobile unit at 2064 and the mobile unit responds with a DISC message to its serving BTS at 2066. The BTS then sends a RELEASE_INDICATION message to the BSC at 2068 and the BSC responds to by sending a RF_CHANNEL_RELEASE message to the BTS at 2070. The BTS responds to the BSC with an RF_CHANNEL_RELEASE_ACK at 2072. The BSC then sends a CLEAR_COMPLETE message to the New MSC at 2074. Finally, the New MSC sends a RLSD message to the BSC at 2076.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A wireless communication system comprising:
   a plurality of mobile switching centers interconnected with one another, the mobile switching centers including visitor location registers;
   a plurality of base station systems, each base station system coupled to each of said plurality of mobile switching centers; and
   a message router coupling the base station systems to the plurality of mobile switching centers for establishing communication between the base station systems and said plurality of mobile switching centers, wherein the message router further assigns mobile units to the plurality of mobile switching centers to equalize the load among the plurality of mobile switching centers, each mobile unit being given a temporary identification number that identifies the mobile switching center to which it is assigned.

2. The wireless communication system of claim 1, wherein the base station system comprises:
   a plurality of base station controllers, each of which couples to each of the plurality of mobile switching centers; and
   for each of the plurality of base stations controllers, a coupled plurality of base stations, each of which supports wireless communications with mobile units.

3. The wireless communication system of claim 1, wherein the message router intercepts a message sent from the base station system and, based upon an assigned temporary identification number, routes the message to a serving mobile switching center.

4. The wireless communication system of claim 3, wherein:
   the message router initially assigns the mobile unit to a serving mobile switching center of the plurality of mobile switching centers to equalize loading among the plurality of mobile switching centers;
   the selected mobile switching center assigns the temporary identification number to the mobile unit; and
   the message router subsequently routes messages from the mobile unit to the selected mobile switching center.

5. The wireless communication system of claim 1, wherein each of the mobile switching centers couples to the public switched telephone network.

6. The wireless communication system of claim 1 wherein the wireless communication system is substantially compliant with an operating standard selected from the group consisting of the Global System for Mobile Communications standard, the Time Division Multiple Access standard, the Code Division Multiple Access standard and the General Packet Radio Service standard.

* * * * *